(12) United States Patent
de Groot

(10) Patent No.: US 9,377,292 B2
(45) Date of Patent: Jun. 28, 2016

(54) INTERFEROMETRY EMPLOYING REFRACTIVE INDEX DISPERSION BROADENING OF INTERFERENCE SIGNALS

(71) Applicant: Zygo Corporation, Middlefield, CT (US)

(72) Inventor: Peter J. de Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 78 days.

(21) Appl. No.: 14/450,376

(22) Filed: Aug. 4, 2014

(65) Prior Publication Data

US 2015/0043006 A1 Feb. 12, 2015

Related U.S. Application Data

(60) Provisional application No. 61/862,557, filed on Aug. 6, 2013.

(51) Int. Cl.
*G01B 9/02* (2006.01)
*G01B 11/24* (2006.01)

(52) U.S. Cl.
CPC .......... *G01B 9/0209* (2013.01); *G01B 9/02069* (2013.01); *G01B 11/2441* (2013.01); *G01B 2290/20* (2013.01)

(58) Field of Classification Search
CPC ............. G01B 9/0209; G01B 9/02069; G01B 11/2441; G01B 2290/20; G01B 11/0608; G01B 11/06; G01B 11/0675
See application file for complete search history.

(56) References Cited

U.S. PATENT DOCUMENTS

| 5,600,441 | A | 2/1997 | de Groot et al. |
|---|---|---|---|
| 6,195,168 | B1 | 2/2001 | de Lega et al. |
| 7,321,431 | B2 | 1/2008 | de Groot |
| 7,796,273 | B2 | 9/2010 | Deck |
| 2004/0085544 | A1 | 5/2004 | de Groot |
| 2004/0189999 | A1 | 9/2004 | de Groot et al. |

(Continued)

OTHER PUBLICATIONS

Hitzenberger et al., Dispersion induced multiple signal peak splitting in partial coherence interferometery, Sep. 1998, Optics Communications, vol. 154, pp. 179-185.*

(Continued)

*Primary Examiner* — Michael P LaPage
(74) *Attorney, Agent, or Firm* — Fish & Richardson P.C.

(57) ABSTRACT

An interferometry system includes: a light source, defining a coherence length, an interferometer configured to combine measurement and reference beams to form an output beam, where the interferometer includes a dispersion imbalance between measurement and reference paths large enough to produce a coherence envelope for the system having a width more than twice the coherence length; a phase modulation device configured to introduce a variable phase between the measurement and reference beams; a detector; imaging optics to direct the output beam to the detector and produce an image of the measurement surface; and an electronic processor electronically coupled to the phase modulation device and the detector and configured to record multiple interference signals corresponding to different locations on the measurement surface, in which the interference signals are based on the intensity of the output beam as a function of the variable phase for the different locations of the measurement surface.

24 Claims, 12 Drawing Sheets

(56) References Cited

U.S. PATENT DOCUMENTS

| | | | |
|---|---|---|---|
| 2005/0078318 A1 | 4/2005 | de Groot | |
| 2007/0046953 A1* | 3/2007 | De Groot | G01B 11/0675 356/512 |
| 2008/0111996 A1* | 5/2008 | Takeda | G01B 11/2441 356/511 |
| 2010/0315652 A1* | 12/2010 | Yelin | G01B 9/0201 356/521 |
| 2012/0257207 A1* | 10/2012 | Marx | G01B 9/02004 356/451 |
| 2013/0229662 A1* | 9/2013 | Ogawa | G01M 11/331 356/453 |
| 2015/0002850 A1* | 1/2015 | Vogler | A61B 3/102 356/479 |

OTHER PUBLICATIONS

Millerd et al., Pixelated phase-mask dynamic interfermeter, Aug. 2004, SPIE vol. 5531, pp. 304-314.*

P. de Groot, Chromatic dispersion effects in coherent absolute ranging. Optics Letters, vol. 17, No. 12, pp. 898-900 (Jun. 15, 1992).

P. de Groot, "Coherence Scanning Interferometry," in Optical Measurement of Surface Topography, edited by R. Leach, pp. 187-208 (Springer Verlag Berlin, 2011).

P. de Groot, "Phase Shifting Interferometry" in Optical Measurement of Surface Topography, edited by R. Leach, pp. 167-186 (Springer Verlag Berlin, 2011).

A. Gosteva et al. "Noise-related resolution limit of dispersion measurements with white-light interferometers", *Journal of the Optical Society of America*, vol. 22, No. 9, pp. 1868-1874 (Sep. 2005).

S. Han et al., "Surface profiler for fixed through-glass measurement", *Proc. of SPIE*, vol. 5716, 189-197 (2005).

F. Köttig et al., "An advanced algorithm for dispersion encoded full range frequency domain optical coherence tomography", *Optics Express*, vol. 20, No. 22, pp. 24925-24948 (Oct. 16, 2012).

Haydn Martin et al., "Dispersed Reference Interferometry", *CIRP Annals—Manufacturing Technology*, vol. 62, pp. 551-554 (2013).

P. Pavlícek et al., "White-light interferometer with dispersion: an accurate fiber-optic sensor for the measurement of distance.", *Applied Optics*, vol. 44, No. 15, pp. 2978-2983 (May 20, 2005).

Using Glass Compensated (GC) Objectives, Zygo Corporation operating manual OMP-0553A (2009).

* cited by examiner

INTERFEROMETRY EMPLOYING REFRACTIVE INDEX DISPERSION BROADENING OF INTERFERENCE SIGNALS

CROSS-REFERENCE TO RELATED APPLICATIONS

This application claims the benefit of prior U.S. Provisional Application No. 61/862,557, filed on Aug. 6, 2013, which is incorporated in its entirety herein by reference.

BACKGROUND

Various depth-from-focus methods provide information about the 3D shape and location of an object by interferometry. Some of these methods are based on optical coherence, often referred to as coherence scanning interferometry (CSI). To measure the height of an object using CSI, the object or a reference surface is scanned relative to the other, such that the phase varies between the frequency components of light traveling along an optical path to and from the object and the frequency components of light traveling along an optical path to and from the reference surface. The scan position at which the optical path length difference between the two light beams is zero corresponds to a point where the components of the two beams are mutually in phase, resulting in an interference signal having maximum signal intensity. Since the position of maximum signal intensity varies depending on the height of the object structure being measured, it is possible to obtain a surface topography of the object by identifying the scan positions corresponding to maximum intensity at different locations on the object surface. To maximize the fringe contrast of detected interference signals, it is generally accepted that a well-designed interferometer should be balanced for refractive index dispersion, particularly when working with broadband light. An advantage of CSI is that it allows for measuring surface structures that are more than one half wavelength in surface height difference from one imaging pixel to the next, without the so-called fringe ambiguity characteristic of phase shifting interferometry (PSI).

However, given the relatively short coherence length of the interferometer system, it is often necessary to reposition one or more parts of the interferometer in order to identify the scan position corresponding to maximum intensity for structures having relatively tall features. Furthermore, it is often necessary to scan over many fringes of the interference signal before the position of maximum intensity can be identified.

SUMMARY

The present disclosure relates to interferometry employing refractive index dispersion.

In general, an aspect of the disclosure can be embodied in an interferometry system that includes: a light source configured to emit light over a range of wavelengths to define a coherence length; an interferometer configured to direct a measurement beam along a measurement path contacting a measurement surface of a measurement object, direct a reference beam along a reference path contacting a reference surface, and combine the measurement and reference beams to form an output beam after the measurement and reference beams contact the measurement and reference surfaces, respectively, in which the measurement and reference beams are derived from the light source, and in which the interferometer includes a dispersion imbalance between the measurement and reference paths large enough to produce a coherence envelope for the interferometry system having a width more than twice the coherence length; a phase modulation device configured to introduce a variable phase between the measurement and reference beams; a detector; imaging optics to direct the output beam to the detector and produce an image of the measurement surface; and an electronic processor electronically coupled to the phase modulation device and the detector and configured to record multiple interference signals corresponding to different locations on the measurement surface, in which the interference signals are based on the intensity of the output beam as a function of the variable phase for the different locations of the measurement surface.

Implementations of the system can include one or more of the following features and/or features of other aspects. For example, in some implementations, the dispersion imbalance in the interferometer is caused by additional material of an optical component in an optical path of one of the measurement and reference paths relative to the other one of the measurement and reference paths. The additional material of the optical component may include glass. The glass may be transparent to light in the ultraviolet wavelength range, visible wavelength range, infrared wavelength range, or combinations thereof. The additional material may have a thickness along the optical path greater than about 10 μm.

In some implementations, the dispersion imbalance introduces a nonlinear phase deviation to the multiple interference signals that is greater than one radian over the full-width half-maximum (FWHM) of the coherence envelope.

In some implementations, the phase modulation device includes a mechanical stage configured to move one of the measurement surface or the reference surface relative to the other one of the measurement surface or the reference surface to introduce a difference in optical path length between the measurement path and the reference path. The mechanical stage may be configured to scan the difference in optical path length over a range larger than the coherence length of the light source.

In some implementations, the reference and measurement beams have orthogonal polarizations, and the phase modulation device comprises a pixelated phase mask, the phase mask comprising an array of unit cells, each unit cell comprising at least three polarizers, and each polarizer being configured to introduce a different discrete phase-shift to the output beam.

In some implementations, the electronic processor is further configured to process the multiple interference signals to determine information about the measurement surface. The information about the measurement surface may include any of a surface topography or a distance from a reference point. The electronic processor may be configured to determine the information about the measurement surface based on interference signals corresponding to a range of optical path differences (OPDs) between the measurement and reference paths that exclude a zero OPD. The electronic processor may be configured to determine the information about the measurement surface based on interference signals corresponding to a range of optical path differences (OPDs) between the measurement and reference paths, in which the absolute values of the OPDs in the range are greater than half the coherence length and smaller than twice the width of the coherence envelope.

The electronic processor may be configured to determine the information about the measurement surface based on interference signals corresponding to a range of optical path differences (OPDs) between the measurement and reference paths, in which the absolute values of the OPDs in the range are greater than the coherence length and smaller than the width of the coherence envelope. The range of OPDs may be smaller than half the coherence length. The electronic processor may be configured to calculate a localized fringe frequency for each of the interferometry signals and uses the calculated localized fringe frequencies to determine the information about the measurement surface. The electronic processor may be configured to cause the detector to measure the interference signals over a range of optical path differences (OPDs) between the measurement and reference paths sufficient to determine the localized fringe frequencies for each of the interference signals. The electronic processor may be configured to calculate each localized fringe frequency based on a location of an intensity peak in a frequency transform of each interference signal. The electronic processor may be configured to calculate a phase step between successive frames recorded by the detector. The electronic processor may be configured to calculate the phase step based on at least four separate intensity values from four corresponding detector frames. The mechanical stage may be configured to scan the difference in optical path length over a range larger than the coherence length of the light source at predetermined scan increments, in which the electronic processor is configured to calculate the localized fringe frequency based on the phase step and the predetermined scan increment. The range of OPDs may be smaller than half the coherence length. The electronic processor may be configured to calculate a relative height for the different locations on the measurement surface based on a difference between the localized fringe frequency and a fringe frequency corresponding to the zero OPD position. The detector may be configured to measure an interference signal at the different locations for each of at least two wavelength bands.

In some implementations, the system further includes at least two wavelength filters positioned to produce the two wavelength bands. The electronic processor may be configured to calculate the localized fringe frequencies based on the interference signals for the at least two wavelength bands.

In some implementations, the light source is configured to emit light in the ultraviolet (UV) spectral region, the infrared (IR) spectral region, the visible spectral region, or combinations thereof. The light source may have a net spectral bandwidth broader than at least 5% of a mean spectral wavelength.

In some implementations, the light source includes an incandescent source, a broadband laser diode, a light-emitting diode, or an arc lamp.

In some implementations, the dispersion imbalance in the interferometer may be caused by a first optical fiber. The system may further include a second optical fiber, in which the first optical fiber is in one of the reference path or the measurement path, and the second optical fiber is in the other one of the reference path or the measurement path. The system may further include a fiber length modulation device coupled to the second optical fiber, in which the modulation device is configured to modulate a length of the second optical fiber to introduce a difference in optical path length between the measurement path and the reference path. The fiber length modulation device may include a piezo-electric fiber stretcher.

In another aspect, the subject matter of the disclosure may be embodied in a method that includes: directing a measurement beam along a measurement path so as to contact a measurement surface of a measurement object; directing a reference beam along a reference path so as to contact a reference surface, in which the measurement beam and the reference beam are derived from light emitted by a common source, and in which the light includes multiple wavelengths and has a coherence length; providing a dispersion-imbalance between the measurement path and the reference path large enough to produce a coherence envelope having a width more than twice the coherence length; combining the measurement and reference beams to form an output beam after the measurement and reference beams contact the measurement and reference surfaces, respectively; directing the output beam to a detector; introducing a variable phase between the measurement and reference beams while directing the output beam to the detector; and recording, from the detector, multiple interference signals corresponding to different locations on the measurement surface, in which the interference signals are based on the intensity of the output beam as a function of the variable phase for the different locations of the measurement surface.

Implementations of the method may include one or more of the following features and/or features of other aspects. For example, in some implementations, providing the dispersion-imbalance includes introducing additional material of an optical component in an optical path of one of the measurement and reference paths relative to the other one of the measurement and reference paths.

In some implementations, introducing the variable phase between the measurement and reference beams includes moving one of the measurement surface or the reference surface relative to the other one of the measurement surface or reference surface to introduce a different in optical path length between the measurement path and the reference path. Moving one of the measurement surface or the reference surface may occur over a distance range larger than the coherence length of the light source.

In some implementations, the method further includes processing the multiple interference signals to determine information about the measurement surface. The information about the measurement surface may include any of a surface topography or a distance from a reference point. Each of the multiple interference signals may correspond to a range of optical path differences (OPDs) between the measurement and reference paths that exclude a zero OPD. Each of the multiple interference signals may correspond to a range of optical path differences (OPDs) between the measurement and reference paths, in which the absolute values of the OPDs in the range are greater than half the coherence length and smaller than twice the width of the coherence envelope. The absolute values of the OPDs in the range may be greater than the coherence length and smaller than width of the coherence envelope. The range of OPDs may be smaller than half the coherence length. Processing the multiple interference signals may include calculating a localized fringe frequency for each of the interferometry signals and using the calculated localized fringe frequencies to determine the information about the measurement surface. The method may further include measuring the interference signals over a range of optical path length differences (OPDs) between the measurement and reference paths that is sufficient to determine the localized fringe frequencies for each of the interference signals. Calculating the localized fringe frequency may include applying a frequency transform to each interference signal and determining a location of an intensity peak for each frequency transform. Recording each interference signal may include recording a plurality of intensity values, and wherein calculating the localized fringe frequency comprises calculating a phase step between successive intensity values. The method may further include calculating the phase step based on at least four separate intensity values. The method may further include scanning the difference in optical path length over a range larger than the coherence length of the light source at predetermined scan increments, in which calculating the localized fringe frequency is based on the phase step and the predetermined scan increments. The range of OPDs may be smaller than half the coherence length. Using the calculated localized fringe frequencies to determine the information about the measurement surface may include calculating a relative height for the different locations on the measurement surface based on a difference between the localized fringe frequency and a fringe frequency corresponding to the zero OPD position. The method may further include measuring an interference signal at the different locations for each of at least two wavelength bands. The method may further include introducing at least two wavelength filters to obtain the two wavelength bands. The method may further include calculating the localized fringe frequencies based on the interference signals for the at least two wavelength bands.

In some implementations, introducing the variable phase between the measurement and reference beams includes modulating a length of an optical fiber in the reference path or the measurement path.

Particular embodiments of the subject matter described in this specification can be implemented so as to realize one or more of the following advantages. For example, in some implementations, a refractive index dispersion imbalanced interferometer increases the useable range of an interferometer without requiring the bandwidth of the light source to be narrowed or the repositioning of interferometer elements. In some implementations, the fringe-frequency chirp characteristic of quadratic phase dispersion enables rapid surface height measurement without requiring the use of a large number of camera frames.

For the purposes of this disclosure, refractive index dispersion is understood to mean a variation in the refractive index of a material as a function of the wavelength of the light traversing the material.

For the purposes of this disclosure, a refractive index dispersion imbalance is understood to mean an imbalance in refractive index dispersion between a measurement path and a reference path of an interferometer that produces at least a quadratic interference phase nonlinearity in an interference signal acquired by combining light from the measurement path and the reference path.

For the purposes of this disclosure, quadratic phase nonlinearity is understood to mean an interference signal phase nonlinearity caused by an optical path difference between light traveling along a measurement path of an interferometer and light traveling along a reference path of an interferometer, where the nonlinearity is a 2nd-order nonlinear function of the optical wavelength of the light.

For the purposes of this disclosure, a localized fringe frequency is understood to mean the average frequency of interference fringes in a localized portion of an interference signal.

The details of one or more embodiments are set forth in the accompanying drawings and the description below. Other features, objects, and advantages will be apparent from the description and drawings, and from the claims.

DETAILED DESCRIPTION

Embodiments of coherence scanning interferometry and systems for performing the same are disclosed in which the interferometer includes a spectrally broadband light source and an imbalance in refractive index dispersion between a reference path and measurement path. The refractive index dispersion imbalance leads to a broadening of a measured interference signal that is recorded for each point on a surface of a measurement object relative to an interference signal obtained an interferometer system in which the dispersion is balanced. The broadened interference signal also exhibits a frequency chirp, in which the localized fringe frequency of the interference signal varies as a function of optical path length difference (OPD) between the reference and measurement paths. Since the localized fringe frequency corresponds to a relative height of the measurement surface, it is not necessary to scan over a large range of OPD to locate a position corresponding to zero OPD, as in standard CSI. Instead, one can infer a height or surface topography of the measurement object by analyzing almost any localized portion of the interference signal, providing the ability to perform rapid height measurements. Furthermore, given that the interference signal is much broader in a dispersion-imbalanced interferometer system, such measurements of surface height can be performed over a larger range of OPD, without requiring the repositioning of the interferometer optical components.

Figure 1:
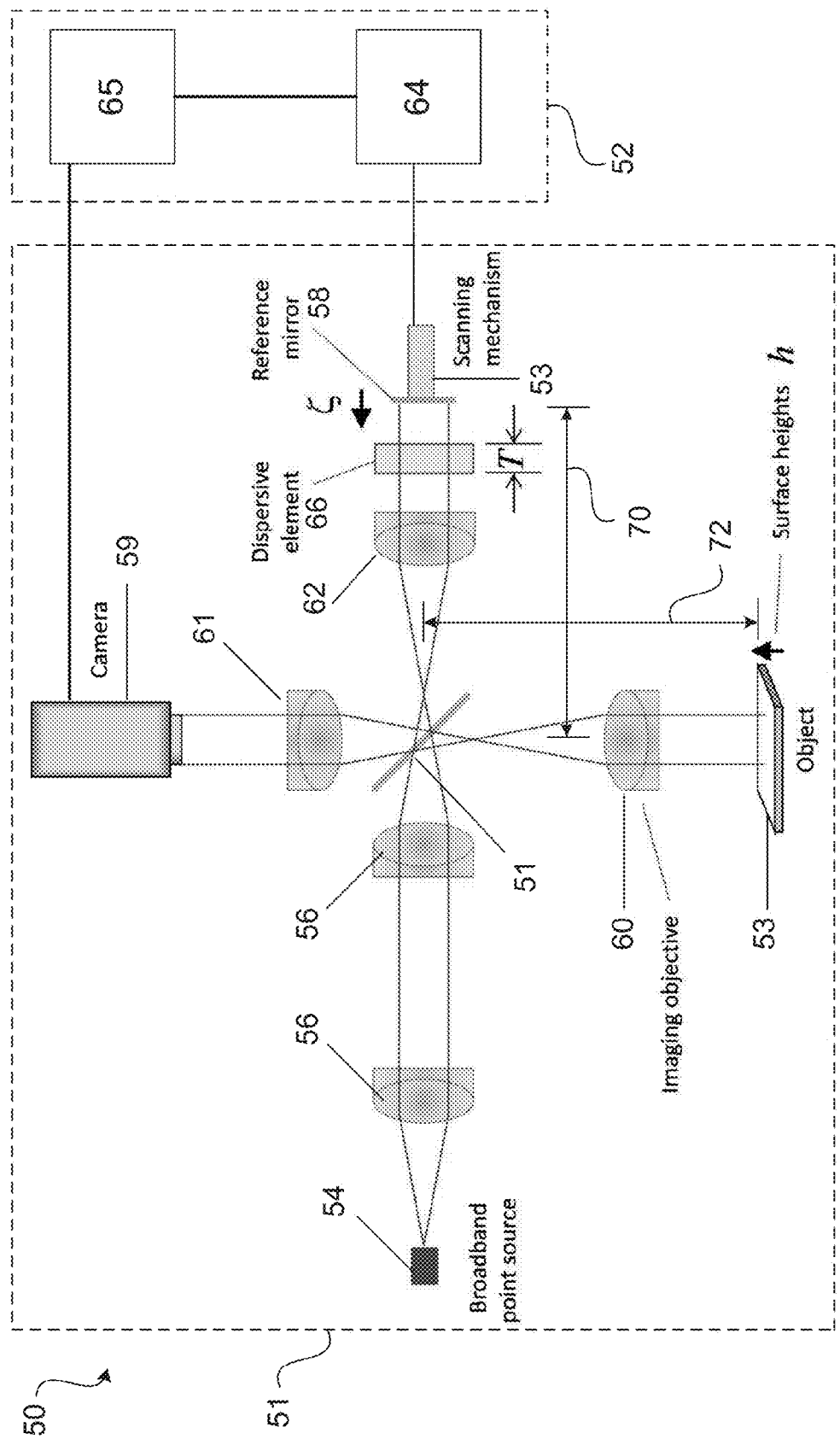
FIG. 1 is a schematic of an example coherence scanning interferometry system.

Referring to FIG. 1, an exemplary measurement system 50 for obtaining interference signals includes an interferometer 51 and computer control system 52. The measurement system 50 is operable to determine one or more spatial properties of a measurement object 53. In some embodiments, the one or more spatial properties relate to a topography and/or a location of the object 53 and/or points on the object 53 with respect to another object, e.g., a portion of system 50, and/or other points on the object 53. In some embodiments, the other object is a reference portion of a metrology system.

The interferometer 51 includes a spectrally-broadband and low coherence source 54 that outputs light having a plurality of different wavelengths. The light output from source 54 may be provided from a single device or, alternatively, from multiple individual devices that output a plurality of different wavelengths. The light source in the interferometer may be any of: an incandescent source, such as a halogen bulb or metal halide lamp, with or without spectral bandpass filters; a broadband laser diode; a light-emitting diode; a combination of several light sources of the same or different types; an arc lamp; any source in the visible spectral region; any source in the IR spectral region, particularly for viewing rough surfaces and applying phase profiling; or any source in the UV spectral region, particularly for enhanced lateral resolution. For broadband applications, the source preferably has a net spectral bandwidth broader than 5% of the mean wavelength, or more preferably greater than 10%, 20%, 30%, or even 50% of the mean wavelength. The source may also include one or more diffuser elements to increase the spatial extent of the input light being emitted from the source.

The interferometer 51 includes one or more source lenses 56 to transmit an input beam from the light source to a beam-splitting element 57. The beam-splitting element 57 then splits the input beam into a first portion which is directed along a reference path to a lens 62 and reference object 58. In some embodiments, reference object 58 is optically flat and includes only a single reflecting surface. For example, reference object 58 can be a reference mirror and/or exhibits a three-dimensional surface topography. In the following discussion, it is assumed without limitation that reference object 58 is a reference mirror including a single reflective surface.

Beam-splitting element 57 also directs a second portion of the input beam to an imaging objective lens 60, which directs the second portion onto measurement object 53. Beam-splitting element 57 combines light reflected from reference mirror 58 and from measurement object 53. The combined light is directed to a lens 61, which transmits the combined light to a detector 59. Light reflected from measurement object 53 and from reference object 58 interfere at detector 59, which produces detector signals indicative of the resultant beam intensity. Other types of interferometers that generate an interference pattern at the detector are also within the scope of the present disclosure. For example, such interferometers may use more or fewer lenses, and/or replace one or more lenses with different optical elements having optical power (e.g., curved mirrors), and/or introduce other types of optical elements (e.g., polarization optics, folding mirrors, etc.) in the system.

Interferometer 51 includes an additional dispersive optical element 66 in the reference path, in which the dispersive element 66 has a wavelength dependent refractive index property. Alternatively, the interferometer 51 may include the dispersive optical element 66 in the measurement path. The dispersive optical element 66 may be used to alter the overall refractive index dispersion of the path (reference or measurement) in which the element 66 is located. Furthermore, dispersive optical elements having different properties may be provided in the reference and measurement paths, respectively.

Detector 59 typically includes a plurality of detector elements, e.g., pixels, arranged in at least one and more generally two dimensions for measuring an optical interference pattern with spatial resolution. In the following discussion, it is assumed without limitation that detector 59 includes a two-dimensional array of detector elements, such as a CCD or CMOS detector. In the embodiment shown, lens 60 and lens 61 focus light reflected from measurement object 53 onto detector 59 so that each detector element of detector 59 corresponds to a respective point, e.g., a small region or location of measurement object 53. Additionally, lens 62 cooperates with lens 61 to image the reference object 58 onto detector 59. Thus, an interference pattern can be observed at detector 59, even for extended (i.e. spatially incoherent) illumination.

System 50 is typically configured to create an optical path length difference (OPD) between light directed to and reflected from reference object 58 and light directed to and reflected from measurement object 53. In some embodiments, reference object 58 can be displaced or actuated by an electromechanical transducer 63, such as a piezoelectric transducer (PZT), and associated drive electronics 64 controlled by computer 52 so as to effect precise scans along a direction that varies the OPD of the interferometer 51. The variable ζ represents the scan position of the object being translated (e.g., reference object 58 in FIG. 1). In some embodiments, system 50 is configured to alternately modify the OPD by moving measurement object 53. The transducer 63 can be implemented using any applicable translation device including, for example: a piezo-electric device, a stepper motor, and a voice coil, and any of a driver with a flexure mount and any driver with a mechanical stage, e.g. roller bearings or air bearings. In some embodiments, system 50 is configured to modify the OPD by an amount at least as great as height variations in topography of the measurement object 53 relative to system 50. In some embodiments, the optical path length is varied by a distance at least as great as a coherence length, $C_L$, of the interferometer, e.g., on the order of a few microns, or even greater than two or three times of the coherence length.

System 50 can acquire a plurality of detector signals as the OPD is modified, such by scanning a position of reference object 58 or measurement object 53. The detector signals thus acquired at each detector element can be stored in digital format as an array of interference signals, one interference signal acquired from each pixel of detector 59, and each interference signal representing the variation in intensity as a function of OPD for a different location of the measurement object 53. For example, if the detector 59 includes a 128×128 array of pixels and if 64 images are stored during a scan, then there will be approximately 16,000 interference signals each 64 data points in length. In embodiments using a broadband source 54, the interference signals may be referred to as scanning white light interferometry (SWLI) interference signals, more generally as low coherence length scanning interference signals.

The computer 52 also includes an electronic processor 65 coupled to the detector 59 in which the processor 65 acquires the interference data from the detector 59. After the interference data has been acquired, the electronic processor 65 processes the interference signal and outputs data indicative of a surface topography of the measurement object and/or a relative position of the measurement object or of points on the measurement object. For example, the data may be output to memory or to a user interface of a display.

The embodiment shown in FIG. 1 schematically shows an interferometer of the Michelson-type, in which the beam splitter 57 directs the reference light away from the optical axis of the test light (e.g., the beam splitter can be oriented at 45 degrees to the input beam so the test light and reference travel at right angles to one another). In other embodiments, interferometry system 50 can be another type of interferometer. For example, the interferometry system 50 may include a Mirau-type interferometry arrangement. The Mirau-type interferometer includes an objective lens to direct input light towards (and collect light from) the test and reference surfaces, followed by beam splitter to separate the input light into the test and reference light. In the Mirau-type interferometer, the beam-splitter is oriented to direct the reference light back along the optical axis to a small reference mirror in the path of the input light. The reference mirror can be small, and thereby not substantially affect the input light, because of the focusing by the objective lens).

In some embodiments, the interferometry system 50 can include a microscope configured for use with one or more different interference objectives, each providing a different magnification. Each interference objective includes a beam splitter for separating input light into measurement light and reference light. Additional interferometer configurations are also possible. For example, the system can be configured to collect test light that is transmitted through the test sample and then subsequently combined with reference light. For such embodiments, for example, the system can implement a Mach-Zehnder interferometer with dual microscope objectives on each path.

In general, a coherence scanning interferometer is arranged to eliminate or minimize errors caused by refractive index dispersion of optical components and other optical aberrations that occur in the reference path and measurement path. Typically, refractive index dispersion effects are countered by using glass-compensated objectives that balance the dispersion between the reference and measurement paths. That is, each of the measurement and reference path are adjusted so as to exhibit the same amount of refractive index dispersion. For traditional CSI, such compensation is important when using spatially extended, broadband or "white" light to maximize the fringe contrast of fringes within the acquired interference signal, which may be degraded when there is an imbalance in refractive index dispersion effects in both the measurement and reference paths of an interferometer. For the purposes of this disclosure, the reference path is understood as corresponding to the pathway traversed by the first portion of light from the beam-splitter to the reference object and back to the beam splitter, at which point the first portion combines with the second portion of light. Similarly, the measurement path is understood as corresponding to the pathway traversed by the second portion of light from the beam-splitter to the measurement object and back to the beam-splitter, at which point the second portion combines with the first portion. For example, in reference to FIG. 1, the reference path includes the distance 70 from beam-splitter 57 to reference object 58 and back to beam-splitter, whereas the measurement path includes the distance 72 from beam-splitter 57 to measurement object 53 and back to beam-splitter 57.

Figure 2:
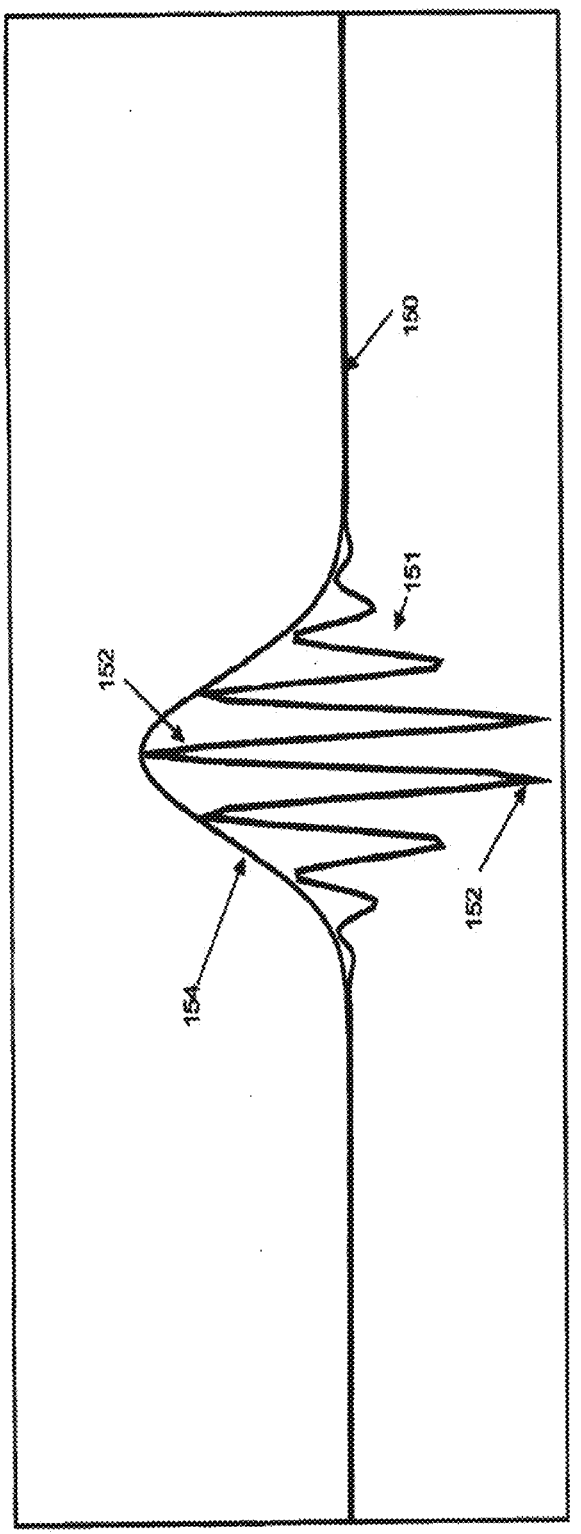
FIG. 2 is a plot of a simulated interference signal obtained from a coherence scanning interferometer.

FIG. 2 is a plot of a simulated interference signal 150 obtained from a coherence scanning interferometer, such as the system 50 shown in FIG. 1, where the refractive index dispersion in both the reference path and measurement path of the interferometer have been balanced. The signal 150 includes a plurality of detector intensity values obtained from a single point of an object, e.g., a point of a silicon wafer having a single reflective interface. The intensity values are plotted as a function of an optical path length difference (OPD) between light reflected from the object point and light reflected from a reference object. Interference signal 150 is a low coherence scanning white light interferometry (SWLI) signal obtained by scanning the OPD, e.g., by moving an optic and/or the object to vary the optical path traveled by the light reflecting from the object or the reference light.

In FIG. 2, the intensity values of the interference signal 150 are plotted as a function of OPD (here scan position ζ) and map out an interference pattern 151 having a plurality of fringes 152, which decay on either side of a maximum according to a low coherence envelope 154. The "coherence envelope" of an interferometry system modulates the fringes in an interference signal produced by the interferometry system for a flat measurement surface. A "coherence envelope width," W, corresponds to the FWHM of the envelope 154. In the absence of a low coherence envelope 154, the fringes of an interference pattern typically have similar amplitudes over a wide range of optical path differences. The envelope 154 itself does not expressly appear in such interference signals but is shown here as a visual aid.

The location of the interference pattern along the OPD axis is generally related to a position of zero OPD, e.g., a scan position or spatial position corresponding to zero OPD between light reflected from the object point and from a reference object. The zero OPD scan position is a function of the object topography, which describes the relative height of each object point, and the orientation and position of the object itself, which influences the position of each object point with respect to the interferometer. The interference signal also includes instrumental contributions related to, e.g., the interferometer optics, e.g., the numerical aperture (NA) of the optics, the data acquisition rate, the scan speed, the wavelengths of light used to acquire the interference signal, the detector sensitivity as a function of wavelength, and other instrumental properties.

For a system in which there is substantially no imbalance in refractive index dispersion between the measurement path and the reference path, the full-width half maximum (FWHM) of the intensity envelope 154 that modulates the amplitudes of fringes 152, i.e., the coherence envelope width, approximately equals the coherence length defined by the light source of the interferometer. Among the factors that determine the coherence length are temporal coherence phenomena related to, e.g., the spectral bandwidth of the source. Typically, the coherence length decreases as the spectral bandwidth of the source increases. An equation for calculating the coherence length L of an interferometer may be expressed as:

$$L = \frac{2\ln(2)}{k_\Delta} \quad (1)$$

where $$k_\Delta = 4\pi\left(\frac{\sqrt{\lambda_0^2 + \lambda_\Delta^2}}{\lambda_0 \lambda_\Delta} - \frac{1}{\lambda_\Delta}\right) \quad (2)$$

is the FWHM bandwidth of the interferometer light source expressed in angular wavenumbers, $\lambda_\Delta$ is the FWHM bandwidth of the interferometer light source expressed in wavelength, and $\lambda_0$ is the central wavelength of the interferometer light source, in which it is assumed the light source exhibits a Gaussian spectral distribution. For example, a Gaussian spectral distribution in wavenumber that is centered at $k_0=1/\lambda_0$ may be expressed as:

$$S(k) = \frac{1}{\sigma_k \sqrt{2\pi}} \exp[-(k-k_0)^2 / 2\sigma_k^2] \quad (3)$$

where $k=2\pi/\lambda$ is the angular wavenumber for a spectral contribution and $\sigma_k$ is the standard deviation, which may be expressed as:

$$\sigma_k = \frac{k_\Delta}{2\sqrt{2\ln(2)}}. \quad (4)$$

Figure 3:
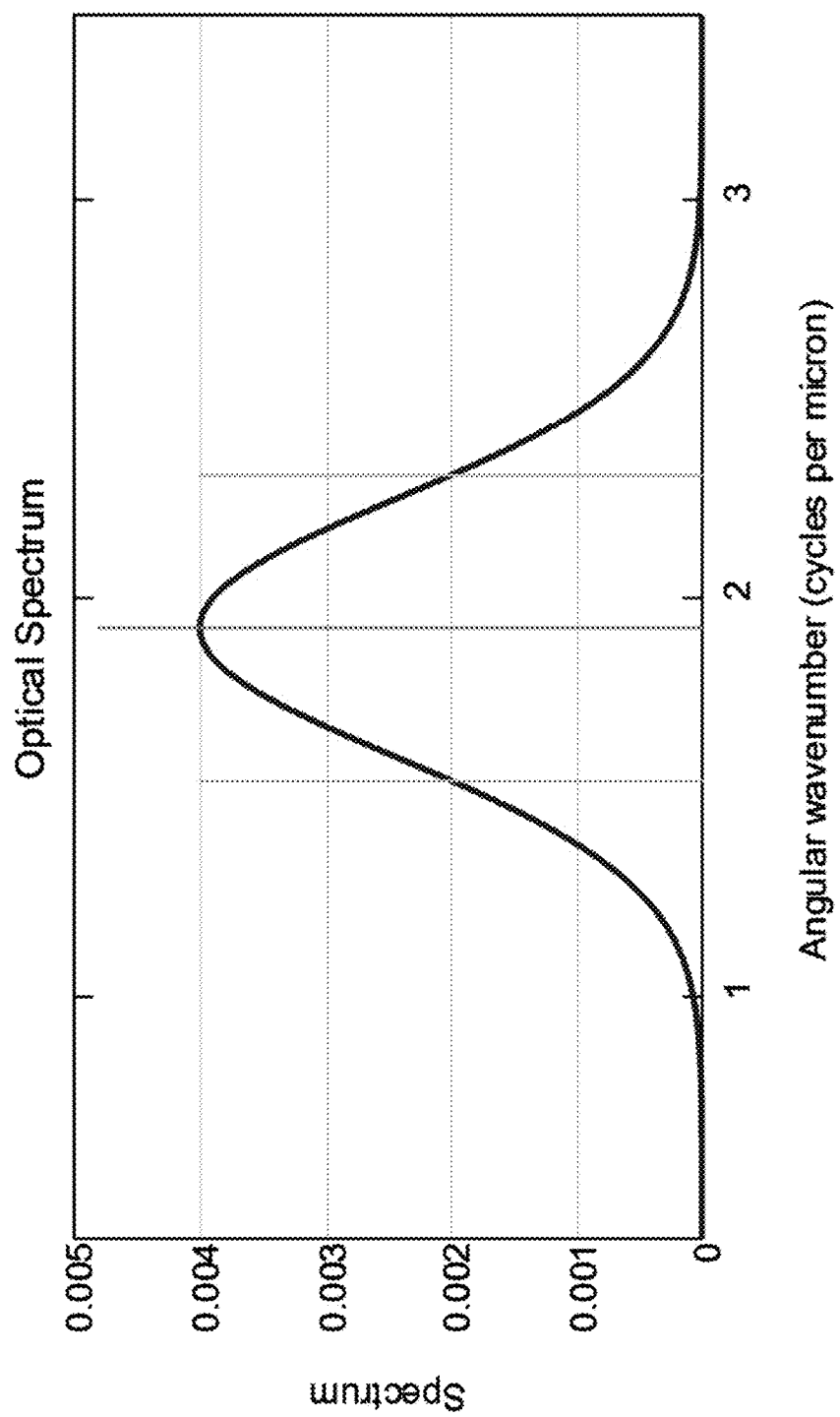
FIG. 3 is a plot of a simulated optical spectrum as a function of angular wavenumber in cycles per micron.
Figure 4:
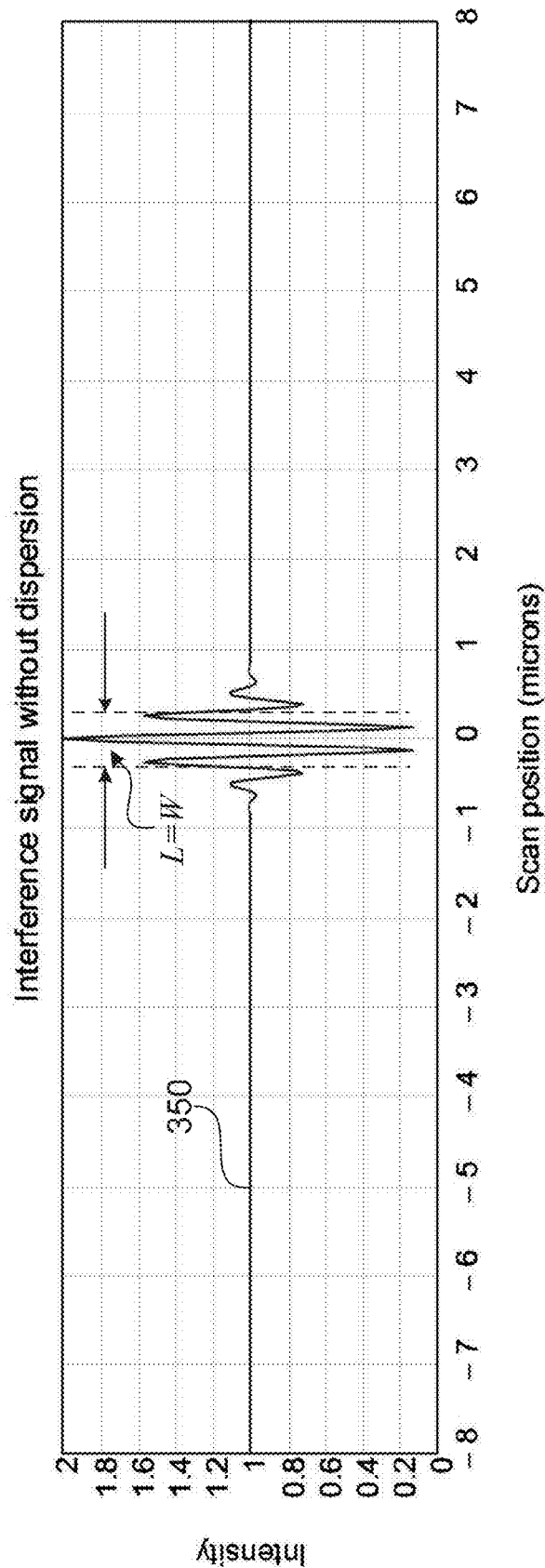
FIG. 4 is a plot of a simulated CSI signal.

An example of the Gaussian spectral distribution versus wavenumber is shown in the plot of FIG. 3. The coherence length of a light in a dispersion-balanced interferometer can be determined experimentally by obtaining an interference signal from an object over a range of optical path lengths in which the object has a single reflecting surface, e.g., not a thin film structure, and calculating the FWHM of the measured signal. For example, FIG. 4 is a plot of a simulated interference signal 350 versus scan position obtained from a dispersion-balanced interferometer system. The scan position may be adjusted, e.g., by moving an optic and/or the object to vary the optical path traveled by the light reflecting from the object or the reference light. The FWHM of the intensity envelope modulating the interference signal 450 is identified as the distance between the vertical dashed lines. The distance shown in FIG. 4 is an approximation and meant as a visual aid only. For the interference signal 450 shown in FIG. 4, the coherence length L and coherence envelope width W are equal.

Once an interference signal has been recorded, various techniques may be used to extract information about the surface of the measurement object. Information about the object may include, for example, a relative surface height h. If a relative surface height is calculated for multiple different positions on the measurement object surface, a surface topography and the object may be obtained. In some cases, the height information may be used to determine a film thickness of a film formed on the object surface. The relative surface height may be calculated for a point on the object by identifying the scan position for which the interference signal strength obtained from the point is a maximum. The scan position corresponding to maximum signal intensity may be calculated using enveloped detection methods such as, for example, demodulation techniques or estimations based on the centroid of the square of the signal derivative. Preferably, the heights are calculated with respect to a reference position established using a separate position within the field of view of the interferometer, another object, a position that is part of the interferometer, or other position in space.

As indicated above, standard CSI systems generally seek to suppress any difference in refractive index dispersion between the reference and measurement paths of the interferometer to achieve the strongest possible interference signal at the peak of the modulation envelope, i.e., where all the interference contributions line up in phase.

However, if an imbalance in refractive index dispersion is introduced between the measurement path and the reference path, the recorded interference signal obtained by combining the reflected measurement and reference beams exhibits a quadratic nonlinearity in phase. For the purposes of this disclosure, the quadratic phase nonlinearity means that the phase of the interference signal is a 2nd-order nonlinear function of the optical wavelength. The quadratic nonlinearity may be characterized by a coefficient $\Gamma$, expressed as $$\Gamma = \frac{k_\Delta^2}{2} \frac{dn}{dk} T. \quad (5)$$

Figure 5:
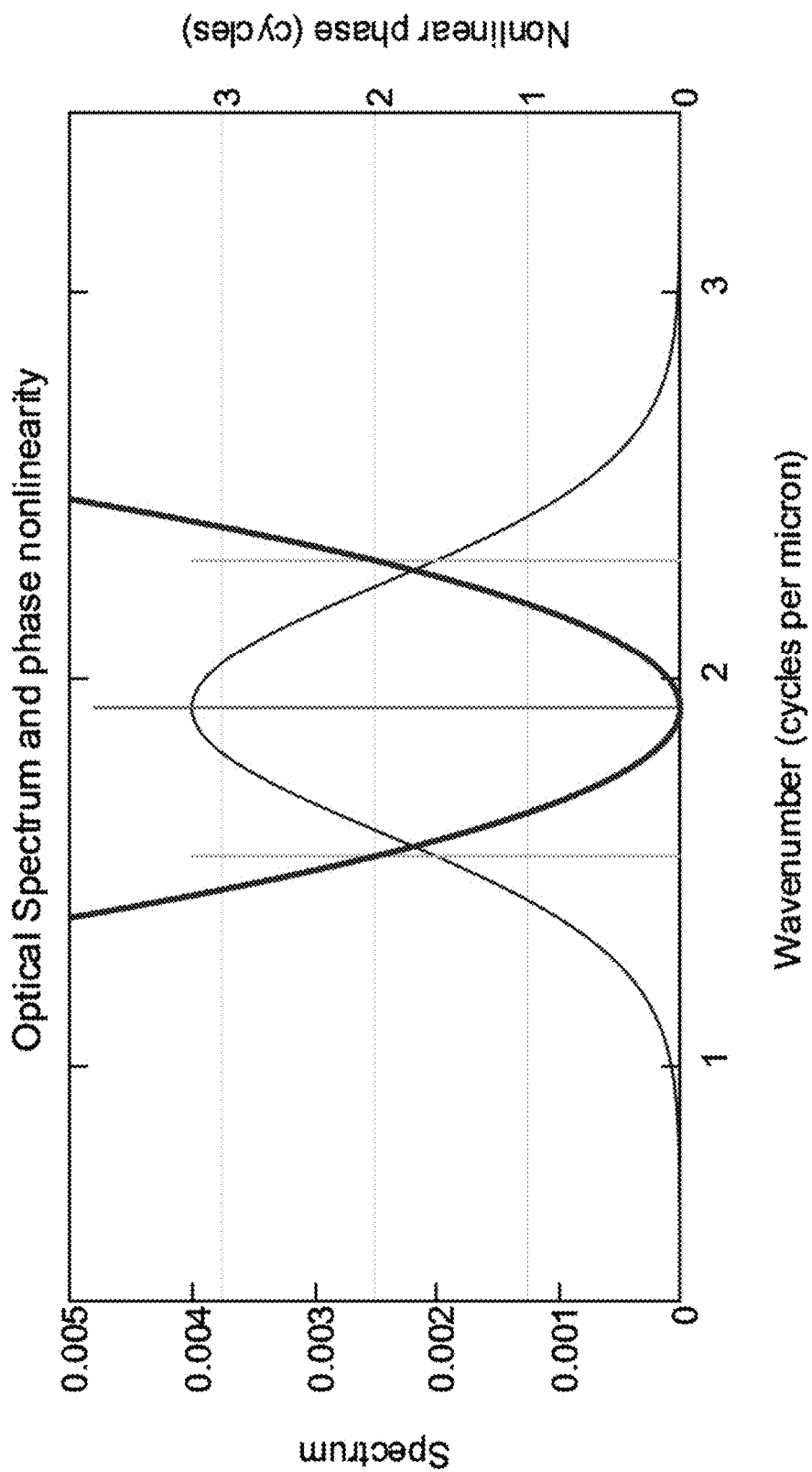
FIG. 5 is a plot of a simulated optical spectrum and a simulated phase nonlinearity curve for an interferometer system having a dispersion imbalance.

Here, T is a physical thickness imbalance for a dispersive material in the interferometer (see, e.g., dispersive optical element 66 in FIG. 1), and n is an index of refraction for the dispersive material. FIG. 5 is a plot that shows the phase nonlinearity as a function of wavenumber for the case of an interference signal produced in an interferometer system where there is a dispersion imbalance between the measurement path and reference path.

Figure 6:
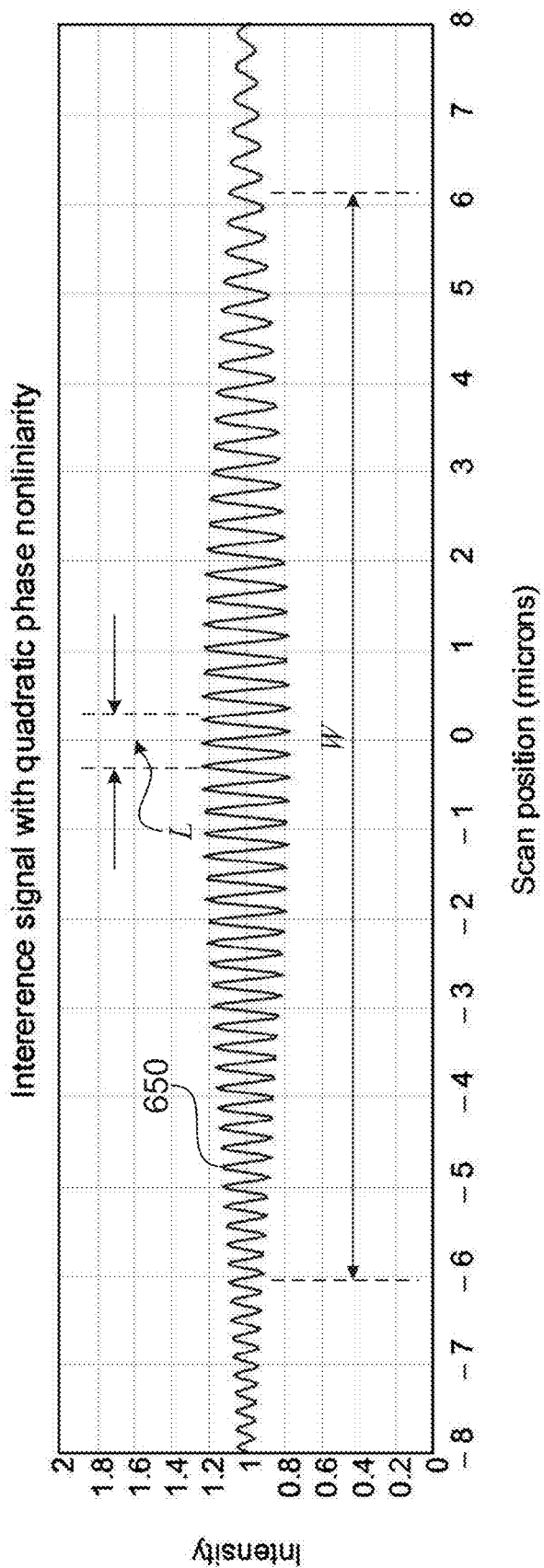
FIG. 6 is a plot of a simulated CSI signal.

The presence of the nonlinearity in phase causes a broadening of the interference signal and a corresponding reduction in peak signal strength, such that there is a substantial increase in the width of the coherence envelope. For example, FIG. 6 is a plot of an interference signal 650 obtained in a dispersion-imbalanced interferometer, in which, relative to the interference signal 450 shown in FIG. 4, the coherence envelope width W is now much greater than the coherence length L defined by the light source of the interferometer (the coherence length L is shown in FIG. 6 for comparison). That is, the fringes of the interference signal now appear over a greater scan distance (and a greater range of OPD) than in the case of a dispersion-balanced interferometer. Furthermore, the maximum amplitude of the interference signal 650 is less than the peak signal intensity of the interference signal 450 produced in a dispersion-balanced system.

In addition, the dispersion imbalance causes the dominant wavelength of the interference signal to vary as a function of OPD, i.e., the interference signal exhibits a fringe frequency chirp. For example, in the interference signal shown in FIG. 6, the dominant frequency (or wavelength) shifts from a relatively high frequency (short wavelength) at the scan position on the left of the plot (e.g., at −8 microns) to a relatively lower frequency (long wavelength) at the scan position on the right of the plot (e.g., at +8 microns).

Despite the increase in coherence envelope width and the reduction in signal amplitude, the interference signal of a dispersion-imbalanced system may still be useful to obtain information about the measurement object in certain implementations. In particular, given that the dominant frequency of the interference signal varies with OPD, it is unnecessary to scan over the entire interference signal to determine the zero OPD position. Rather, one can look at just a subset of the interference signal to identify a localized fringe frequency. With the localized fringe frequency known, one can then determine the relative distance to the zero OPD position and calculate a relative height of a point on the object. For the purposes of this disclosure, a localized fringe frequency is understood to mean the average frequency of interference fringes in a localized portion of an interference signal. The localized fringe frequency may be calculated based on a single full fringe cycle of the interference signal, or multiple fringe cycles of the interference signal.

Since only a subset, and not the entire interference signal, needs to be scanned, an advantage of using a dispersion-imbalanced interferometer is that it enables rapid measurements of surface heights using a minimum number of detector frames. That is, the electronic processor needs to analyze the interference signal for only the number of frames necessary to identify the localized fringe frequency. From those intensity values, the electronic processor may then determine a relative height of the object point. The dispersion-imbalanced interferometer also offers an advantage due to the increase in coherence signal width. Specifically, the scanning range over which the height information can be determined is extended beyond the coherence length defined by light in the dispersion-balanced interferometer. Because the localized fringe frequency can be identified substantially anywhere along this extended portion of the interference signal, as opposed to the zero OPD position, and so long as there is sufficient fringe contrast, measurements can take place well beyond the region of the interference signal corresponding to the coherence length (i.e., beyond the region $C_L$ identified in FIG. 6). As a result, there may be no need to reposition the interferometer to measure the zero OPD position. Furthermore, prior methods of broadening the interference signal by narrowing the bandwidth of the light (e.g., through the use of filters, which could considerably reduce the amount of incident light on the detector) may be rendered unnecessary, thus maintaining an efficient use of the source light.

As an example, the electronic processor of the interferometer system may be configured to determine information about the measurement surface based on interference signals corresponding to a range of OPDs that exclude the zero OPD position. In some implementations, the electronic processor may be configured to determine information about the measurement surface based on interference signals corresponding to a range of OPDs, in which the absolute values of the OPDs in the range are greater than half the coherence length and smaller than twice the width of the coherence envelope. Alternatively, the electronic processor may be configured to determine the information about the measurement surface based on interference signals corresponding to a range of OPDs, in which the absolute values of the OPDs in the range are greater than the coherence length and smaller than the width of the coherence envelope. In some cases, the range of OPDs may be smaller than half the coherence length. In some implementations, the absolute value of OPDs in the range of OPDs may be at least 2 times greater, at least 3 times greater, at least 4 times greater, at least 5 times greater, or at least 10 times greater than the coherence length.

As will be explained further below, various techniques may be used to determine the localized fringe frequency and subsequent height information about the measurement surface of the measurement object. For example, in some implementations, the localized fringe frequency may be determined by transforming the portion of the interference signal recorded by the detector into a frequency domain and then identifying the frequency at which the signal is a maximum. Alternatively, or in addition, phase-shifting interferometry techniques may be used to calculate the phase steps of the interference signal between detector frames. Based on the calculated phase step and scan increments, the corresponding localized fringe frequency for the interference signal may then be computed. In either case, relative height information may then be obtained based on a known or measured frequency of the interference signal at the zero OPD position. Referring back to FIG. 1, the imbalance in dispersion may be introduced into the system 50 using the dispersive optical element 66. The dispersive optical element 66 having a thickness T may be placed in either the reference pathway 70 or the measurement pathway 72. Generally, any material that transmits light over the range of wavelengths emitted by the source 54, or some subset of those wavelengths, and that has a refractive index variation as a function of wavelength that causes the phase nonlinearity, may be used as the dispersive optical element 66.

For example, the dispersive optical element 66 may include any suitable piece of optical glass that is transparent in the visible spectral region (e.g., about 390 nm to about 700 nm), such as fused silica, crystal quartz, borosilicate, calcium fluoride ($CaF_2$), zinc selenide (ZnSe), sapphire, LaSF9, SF10, F2, BaK4, BK7, FK51A, S—FSL5, N—BK7, N—K5, B270/S1, N—SK11, N—BaK4, N—BaK1, L-BAL35, N—SK14, N—SSK8, N—F2, BaSF1, N—SF2, N—LaK22, S—BaH11, N—BaF10, N—SFS, N—SF8, N—LaK14, N—SF15, N—BaSF64, N—LaK8, N—SF18, N—SF10, S—TIH13, N—SF14, N—SF11, N—SF56, N—LaSF44, N—SF6, N—SF57, N—LaSF9, N—SF66, or S-LAH79. The dispersive optical element 66 may also include materials other than glass that are transparent in the visible spectral region. For example, the dispersive element 66 may include polymers such as polycarbonate (PC), polydimethylsiloxane (PDMS), polymethyl methacrylate (PMMA) or other acrylic, or polypropylene, among others.

The dispersive optical element is not limited to materials that are transparent in the visible range of wavelengths, but may include materials that are transparent to different or additional wavelength ranges such as the UV (e.g., between about 390 nm and about 10 nm) and/or IR (including, e.g., near IR between about 0.78 microns to about 3 microns, mid IR between about 3 microns to about 50 microns, and far IR between about 50 microns to about 1000 microns) spectral regions. For example, the dispersive optical element 66 may include barium fluoride ($BaF_2$), cadmium telluride (CdTe), $CaF_2$, cesium bromide (CsBr), cesium iodide (CsI), fused silica-infrared grade, gallium arsenide (GaAs), germanium (Ge), lithium fluoride (LiF), magnesium fluoride ($MgF_2$), potassium bromide (KBr), potassium chloride (KCl), sodium chloride (NaCl), thallium bromoiodide (KRS-5), ZnSe, zinc sulfide (ZnS), or silicon, each of which is transparent to wavelengths in the infrared. One of more of the foregoing materials may also be transparent in the UV spectral region. For example, quartz, $CaF_2$, $BaF_2$, and sapphire are each transparent to UV.

As will be explained further below, the thickness T of the dispersive optical element 66 alters the level of phase dispersion in the measured interference signal. For the purposes of this disclosure, the thickness T of the dispersive optical element 66 is understood to correspond to the length light travels through a single pass of the element 66. If the optical element 66 is in multiple pieces, then the thickness T corresponds to the total length traveled by the light through each of the pieces of the dispersive optical element 66 in a single path.

The thickness of the dispersive optical element 66 is preferably large enough to increase the coherence width of the interference signal beyond the coherence length defined by the light source. For example, the thickness may be large enough to cause the coherence width to be between about 1 and 1.5 times the coherence length, between about 1 and 2 times the coherence length, between about 1 and 5 times the coherence length, between about 1 and 10 times the coherence length, between about 1 and 20 times the coherence length, between about 1 and 30 times the coherence length, between about 1 and 40 times the coherence length, or between about 1 and 50 times the coherence length. The useable scan range may be increased by a factor of at least 2, at least 5, at least 10, at least 20, at least 30, at least 40, or at least 50 relative to an identical refractive index dispersion balanced coherence scanning interferometer. In some embodiments, the useable scan range may be increased by at least 1 micron, at least 2 microns, at least 5 microns, at least 10 microns, at least 15 microns, at least 20 microns, at least 30 microns, at least 40 microns, at least 50 microns, or at least 60 microns.

Assuming the dispersive optical element has a uniform thickness through which the reference or measurement light passes, the thickness along the optical path may be greater than about 50 microns, greater than about 100 microns, greater than about 200 microns, greater than about 300 microns, greater than about, 400 microns, greater than about 500 microns, greater than about 600 microns, greater than about 750 microns, greater than about 1 mm, greater than about 1.5 mm, greater than about 5 mm, greater than about 10 mm, greater than about 50 mm, greater than about 100 mm, greater than about 250 mm, greater than about 500 mm, greater than about 750 mm, or greater than about 1 cm.

The variation of refractive index in the dispersive optical element 66 may be nonlinear or substantially linear over the range of wavelengths output by source 54 or over some subset of the wavelengths output by source 54 (e.g., over the range of wavelengths that are transmitted through optical element 66 if a portion of the output light is filtered or blocked). For example, the refractive index variation of the dispersive optical element 66 may be substantially linear over the entire range of wavelengths output by the source 54. Alternatively, the refractive index variation may be substantially linear over a subset such as, for example, 50% or less, 40% or less, 30% or less, 20% or less, or 10% or less of the range of wavelengths output by the source 54.

In some implementations, the dispersion may be approximated as a linear change in refractive index. For example, the dispersion dσ/dk may be expressed approximately as:

$$\frac{dn}{dk} \approx \frac{n_2 - n_1}{k_2 - k_1} \tag{6}$$

where the wavenumbers $k_1$ and $k_2$ are the angular wavenumbers at wavelengths $\lambda_1$ and $\lambda_2$, respectively, and $n_1$ and $n_2$ are the refractive index of the material at wavelengths $\lambda_1$ and $\lambda_2$, respectively. The material for the dispersive optical element 66 may have an approximately linear dispersion value such as, for example, a dispersion greater than 1.1 nm, greater than 1.5 nm, greater than 2 nm, greater than 2.5 nm, greater than 3 nm, greater than 3.5 nm, or greater than 4 nm. Other dispersion values are possible as well.

The dispersive optical element 66 may be introduced into the reference path or the measurement path as a single piece of material, such as a glass block, or the optical element 66 may alternatively be incorporated into the reference path or measurement path in multiple pieces, such as two or more glass blocks of equal or differing thicknesses. So long as the component 66 is situated in either the reference or the measurement path, the component may be positioned at various locations along those paths. For example, the component 66 may be located between the reference object 58 and the lens 62 or between the lens 62 and the beam-splitter 51. In the case of multiple dispersive optical elements, one or more elements may be located between the beam-splitter 51 and the lens 62 and one or more other elements may be located between the lens 62 and the reference object 68. However, it is preferable that all rays of the light have the same nominal optical path length. For example, the component 66 in FIG. 1 is located in the collimated region of the reference path, such that each ray of the light beam has the same nominal optical path length through the dispersive material.

In some implementations, the dispersive optical element 66 may be included as part of another functional component within the interferometer 51. That is, the imbalance in refractive index dispersion between the reference path and the measurement path may be introduced through optical components that serve other functions within the interferometer 51. For example, in some implementations, the dispersive optical element 66 may double as lens 62 in the reference path. The component 66 may include an achromat lens that compensates for the refractive index dispersion over the length of the lens itself. In this way, the rays from the light beam passing through the lens would behave the same way, and the dispersion imbalance between the two arms of the interferometer would be maintained. In some implementations, each of the measurement path and the reference path may include an optical fiber that carries light between the beam-splitter 51 and the reference object 58 and between the beam-splitter 51 and the measurement object 53. Either the fiber of the reference path or the measurement path may be composed of a material that has a refractive index variation with wavelength that differs from the refractive index variation of the optical fiber of the other path thus causing the imbalance between the two paths.

As explained above, the localized fringe frequency may be calculated based on a minimum of at least one fringe of the interference signal. In some cases, the localized fringe frequency may be calculated based on the measurement of a sequential number of successive interference fringes. For example, the local fringe frequency can be calculated using an average of at least two successive fringes, at least three successive fringes, at least four successive fringes, or at least five successive fringes of the interference signal. Other numbers of fringes greater than one, including non-integer values, also may be used to calculate the local frequency. The local fringe frequency may be calculated based on an average fringe frequency over a specified distance of the interference signal. For example, the local fringe frequency may be calculated based on an average fringe frequency over at least 0.25 microns, at least 0.5 microns, at least 0.75 microns, at least 1 micron, at least 1.5 microns, or at least 2 microns of the interference signal. In some implementations, the mean local frequency of a scan position may be calculated by measuring the phase of the interference signal at at least two different positions over a specified scan distance. For example, the sample spacing may be ¼ the light wavelength or ⅛ the light wavelength (e.g., 0.07 microns for green-yellow light), corresponding to 4 samples per interference fringe or one sample every 90 degrees of phase. In some cases, the phase may be sampled at sub-Nyquist frequencies (i.e. below twice the interference fringe frequency), such as ⅜ or ⅝ the wavelength. Preferably, the calculation of the mean local frequency based on the phase measurements different positions is used for low NA systems, where the depth of focus is sufficient to accommodate the measurement range without focus adjustment.

Principles of Surface Metrology Based on Refractive Index Dispersion Imbalance

The basic principles underlying surface metrology based on refractive index dispersion will now be discussed. For the purposes of this analysis, the interferometer 51 of FIG. 1 is assumed to operate with a small, broadband light source in which the dispersive optical element 66 is located in the collimated portion of the reference path 70. Furthermore, the optical path length scanning is assumed to occur by adjusting distances in collimated space, e.g., by translating the position of the reference object 58 with respect to the remaining portion of the interferometer 51. This simplifies the discussion of basic principles by taking out issues of illumination or imaging angle.

A reasonably good model for the generation of spectrally-broadband interference signals involves an incoherent superposition of signals over a range of angular fringe frequencies expressed, e.g., in radians per micron. These frequencies refer to the rate at which interference fringes pass by as a function of the reference scan position $\zeta$. The fringe frequency K depends on the wavelength $\lambda$ and any geometric factors such as incident angle that can influence the rate at which the interference fringes pass by as a function of a displacement. For the system 50 illustrated in FIG. 1, the reference object 58 (e.g., a mirror) is in collimated space and a scan of the reference object 58 results in a fringe frequency $$K = 2k \tag{7}$$

where, as noted above, $$k = 2\pi/\lambda \tag{8}$$

is the angular wavenumber for a spectral contribution. The signal for interference recorded by the detector 59 at a fringe frequency K can be expressed as $$g(K, \zeta, h) = 1 + \Omega \cos[\theta(K, \zeta, h)], \tag{9}$$

where $\theta(K, \zeta, h)$ is the interference phase, h is the surface height defined relative to other surface heights, and $\Omega$ is the interference fringe contrast, here assumed to be a constant value for all values of K,ζ,h. The total interference signal may then be expressed as the sum weighted by the weighting factor S(K) (in inverse units to K) over all of the contributing interference patterns:

$$I(\zeta, h) = \int_0^\infty g(K, \zeta, h) S(K) dK. \tag{10}$$

For low numerical aperture systems, such as the example of FIG. 1, the weighting factor S(K) follows directly from the optical spectrum of the light source. As noted in the previous section, the spectral distribution can be a Gaussian in wavenumber, centered at $k_0=1/\lambda_0$ (where $\lambda_0$ is the center wavelength) and having a standard deviation $\sigma_k$:

$$S(k) = \frac{1}{\sigma_k \sqrt{2\pi}} \exp[-(k-k_0)^2/2\sigma_k^2]. \tag{11}$$

The spectrum as defined by Eq.(11) is normalized so that its integral over all k is equal to one. The parameter K/2 may be substituted for k in Eq.(10).

Once again, the relationship between the standard deviation and the FWHM of the spectrum is:

$$\sigma_k = \frac{k_\Delta}{2\sqrt{2\ln(2)}} \tag{12}$$

where $$k_\Delta = 4\pi \left( \frac{\sqrt{\lambda_0^2 + \lambda_\Delta^2}}{\lambda_0 \lambda_\Delta} - \frac{1}{\lambda_\Delta} \right) \tag{13}$$

is the FWHM bandwidth expressed in angular wavenumbers for a FWHM bandwidth $\lambda_\Delta$ expressed in wavelength.

Referring to the example shown in FIG. 3, the simulated optical spectrum has a 520-nm mean wavelength $\bar{\lambda}$ and a broad, 200-nm FWHM bandwidth. One cycle in the plot is equal to 2π. The plot of FIG. 3 includes a center marker 300 at the center wavenumber $k_0$ of 1.923 cycles/μm, and two side markers 302 at the FWHM points at ±0.38 cycles/μm. The spectrum was normalized so that a discrete integration of the spectrum was equal to one for the 940 sample points shown in the plot.

For modeling I (ζ,h) using a discrete sum over all discrete frequencies $K_v$, Eq.(10) can be represented as $$I(\zeta, h) = \sum_{v=0}^{V-1} g(K_v, \zeta, h) S(K_v) \delta K = 1 \tag{14}$$

where δK is the frequency interval (sometimes referred to as the frequency bin size). The assumed normalization for the spectrum is $$\sum_{v=0}^{V-1} S(K_v) \delta K = 1. \tag{15}$$

Numerically, it is sometimes convenient to form $$S'_v = S(K_v)\delta K \tag{16}$$

where $S'(K_v)$ is now a unitless distribution.

In a dispersion-compensated interferometer, the interference phase is typically expressed as $$\theta(K,\zeta,h) = (h-\zeta)K + A \tag{17}$$

where the constant phase value A is the phase gap.

However, in an interferometer that has not been balanced for dispersion, there is an additional term related to the wavelength-dependent refractive index n(k) in the optical materials that make up the interferometer. In FIG. 1, the dispersive optical element 66 (e.g., a single block of glass of thickness T) models this contribution. Approximating the index dispersion as linear about a value $\bar{n}$ at a wavenumber $\bar{k}$ (which, for example, may be equal to the central spectral wavenumber $k_0$ for a Gaussian spectrum) the refractive index can be expressed as $$n(k) = \bar{n} + (k - \bar{k})\frac{dn}{dk} \tag{18}$$

and the corresponding interference phase using K=2k is now $$\theta(K, \zeta, h) = (h-\zeta)K + K\bar{n}T + \frac{1}{2}K(K-\bar{K})\frac{dn}{dk}T + A. \tag{19}$$

Completing the square, we have $$\theta(K, \zeta, h) = \tag{20}$$
$$(h-\zeta)K + K\bar{n}T + \frac{1}{2}(K-\bar{K})^2\frac{dn}{dk}T + \frac{1}{2}\bar{K}(K-\bar{K})\frac{dn}{dk}T + A,$$

leading to $$\theta(K, \zeta, h) = (h - \zeta + \bar{\zeta})K + \frac{(K-\bar{K})^2}{k_\Delta^2}\Gamma + A' \tag{21}$$

where $$\bar{\zeta} = \bar{n}T + \frac{1}{2}\bar{K}\frac{dn}{dk}T \tag{22}$$

$$A' = A - \frac{1}{2}\bar{K}^2\frac{dn}{dk}T \tag{23}$$

$$\Gamma = \frac{k_\Delta^2}{2}\frac{dn}{dk}T. \tag{24}$$

Therefore the presence of a material having, at least locally within a spectral bandwidth, a linear index dispersion will result in a revised phase gap A', a displacement offset $\bar{\zeta}$, and a quadratic phase coefficient Γ. The spectral bandwidth $k_\Delta$ is included in the definition of Γ so as to facilitate its interpretation: Γ is the value of the quadratic nonlinear phase contribution when the fringe frequency corresponds to the FWHM points in the optical spectrum. In some implementations, a non-linear index dispersion can be modeled by adding higher-order terms in the expansion of n(k) in terms of (k-$\bar{k}$) in Eq.(18).

The plot shown in FIG. 5 is a simulation of phase nonlinearity as a function of wavenumber superimposed on the optical spectrum from FIG. 3 for the case of an interference signal obtained in an interferometer system having a dispersion imbalance due to a dispersive optical element formed of $SiO_2$ (dn/dk=2.141, thickness T=504 μm). In the simulated phase curve shown in FIG. 5, the quadratic phase contribution reaches 2 cycles of phase at the FWHM points in the spectrum. In contrast, for a dispersion-balanced interferometer, the phase curve would be a straight line.

As explained in the previous section, the quadratic phase term leads to both a broadening of the interference signal, as well as a variation in the dominant interference fringe frequency as a function of OPD. Summarizing the results from above, the interference signal measured by the detector 59 can be expressed as $$I(\zeta, h) = \int_0^\infty g(K, \zeta, h) S(K) \, dK \quad (25)$$

in which the interference signal is constructed by incoherent superposition of the interference contributions $$g(K,\zeta,h) = 1 + V \cos[\theta(K,\zeta,h)], \quad (26)$$

where the phase is $$\theta(K, \zeta, h) = (h - \zeta - \overline{\zeta})K + \frac{(K - \overline{K})^2}{k_\Delta^2}\Gamma + A'. \quad (27)$$

In standard scanning white light interferometry (SWLI), or more generally, coherence scanning interferometry (CSI), the design principles seek to balance the interferometer to suppress dispersion, so that $\Gamma = 0$. In the conventional case, and assuming a Gaussian spectrum S(K), the superposition of interference contributions in Eq.(25) leads to the SWLI signal shown in FIGS. 2 and 4 having a modulation envelope. The peak of this envelope is the so-called stationary phase point $h_{peak}$, where all of the contributions g(K,ζ,h) line up in phase and the incoherent sum results in the strongest interference signal. To find this point mathematically, the derivative of the phase θ(K,ζ,h) is determined with respect to the fringe frequency K and set to zero.

Applying the stationary-phase principle to Eq.(27), the stationary phase point is calculated to be at the location $$h_{peak} = (\zeta + \overline{\zeta}) - 2\frac{(K - \overline{K})^2}{k_\Delta^2}\Gamma. \quad (28)$$

For a dispersion-free system, the scan position corresponding to the peak of the coherence envelope, $\zeta = h_{peak}$, occurs at the zero OPD position. For example, FIG. 4 shows the characteristic localization of interference fringes about the zero OPD position (i.e., ζ=0 in the plot for a uniformly flat surface). The FWHM for the spectrum in wavenumbers is 0.768 cycles/micron, and the coherence length, calculated using Eq.(1), is rather short at 0.29 microns.

When there is dispersion, however (introduced, e.g., using the dispersive optical element 66), the peak is shifted away from the zero OPD position by an amount $\overline{\zeta}$, to the position of zero group-velocity OPD (GOPD). Eq. (28) also includes a fringe-frequency dependent term related to Γ. The result of the fringe-frequency dependent term is the spreading of the modulation envelope over a range of height values and a distance-dependent frequency chirp in the carrier underneath the envelope. For example, for an assumed quadratic phase dispersion of 4π, the simulated interference signal shown in FIG. 6 exhibits a substantial increase in the coherence envelope width relative to the coherence width for the interference signal shown in FIG. 4. Though there is a corresponding reduction in peak fringe contrast at zero OPD (the maximum value of the signal in FIG. 6 decreases by more than a factor of 4 to 23% of fringe contrast relative to the maximum value of the signal in FIG. 4), the FWHM of the modulation envelope increases by a factor of 20 to more than 10 microns.

To determine the height in the dispersion-imbalanced interferometer system, the zero GOPD position $\overline{\zeta}$ is set equal to $h_{peak}$ in Eq.(28), and the height h follows from the measured interference fringe frequency K using, for example, the following formula:

$$h(K - \overline{K})\frac{2\Gamma}{k_\Delta^2} \quad (29)$$

where $\overline{K}$ is the known from the characteristic optical spectrum of the source light or the measured frequency at the zero OPD position. For example, if the centroid of the optical frequency spectrum is $\overline{\lambda}$, then $\overline{K} = 2\pi\overline{\lambda}$. The measured interference fringe frequency K can correspond to a localized fringe frequency that is calculated based on a minimum of at least one fringe of the interference signal. In some cases, the localized fringe frequency may be calculated based on the measurement of multiple successive interference fringes of the interference signal.

To show the frequency chirp more clearly, Eq.(28) may be inverted and the object height h may be set equal to the zero GOPD position $\overline{\zeta}$, to demonstrate how the fringe frequency for peak fringe contrast varies as a function of scan position ζ:

$$K = \overline{K} + \frac{k_\Delta^2}{2\Gamma}\zeta. \quad (30)$$

As is evident from Eq.(30), the fringe frequency increases as a function of scan position at a rate inversely proportional to the quadratic nonlinearity coefficient Γ and proportional to the spectral bandwidth $k_\Delta$. This effect is moderated by the optical spectrum of the light source, which tends to pull the frequency back to $K_0$, and is only meaningful for fringe frequencies K corresponding to wavenumbers within the source bandwidth. Notwithstanding these factors, the frequency chirp related to a shift in the stationary phase point may be readily observed.

For example, for the simulated interference signal shown in FIG. 6 the dominant frequency (or wavelength) shifts from a relatively high frequency (short wavelength) at the scan position on the left of the plot (e.g., at −8 microns) to a relatively lower frequency (long wavelength) at the scan position on the right of the plot (e.g., at +8 microns). When a broadband white light source is used and the interference signal is viewed using a color detector, the interference signal may exhibit a shift in the dominant visible wavelength as a function of scan position, e.g., from red to blue going from left to right in FIG. 6.

Eq.(29) provides an approximate distance measurement of the object surface height as a function of localized fringe frequency. The precision of the height measurement may be further improved by making use of the phase information obtained from the transform of the interference signal into frequency space. For example, once the peak height is measured at one or more pixels of the detector using Eq.(29), the phase at the peak height for each pixel, i.e., the phase of the interference signal corresponding to the peak fringe frequency, then is calculated. The phase may be measured using the Fourier component of K or, alternatively, using a PSI algorithm. With that information in hand, a phase gap A may be calculated, and the final surface height may be expressed as:

$$h_\theta = \frac{\theta}{K} + \frac{2\pi}{K}\text{round}\left(\frac{A - \langle A \rangle}{2\pi}\right) \quad (31)$$

where the "phase gap" is $$A = \theta - Kh_{peak} \quad (32)$$

and $\langle A \rangle$ is the average over the field of view of the phase gap. The round( ) function returns the nearest integer to its argument. Eq.(31) may apply to a two-dimensional detector, in which the pixels of the detector are arranged in an array that spans the x and y directions.

Determining Object Height

The fringe frequency chirp characteristic resulting from the quadratic phase dispersion may be used to perform rapid surface topology measurements within a reduced number of detector frames compared to an interferometer system in which the refractive index dispersion is balanced. Since the dominant frequency/wavelength of the interference signal varies with the scan position, a relative object height can be inferred by translating the scanning stage to any location within the useable scan range and measuring the localized fringe frequency at that location. Fourier or other analysis algorithms may be used to detect the peak frequency of signal oscillations for the localized region of the interference signal. With the localized fringe frequency known, the corresponding object height may be calculated using Eq.(29). Translating the stage over the entire useable range of the interference signal to determine a zero OPD position is therefore unnecessary, and a relative height can be determined using the minimum number of detector frames necessary to identify the dominant localized fringe frequency.

Figure 7:
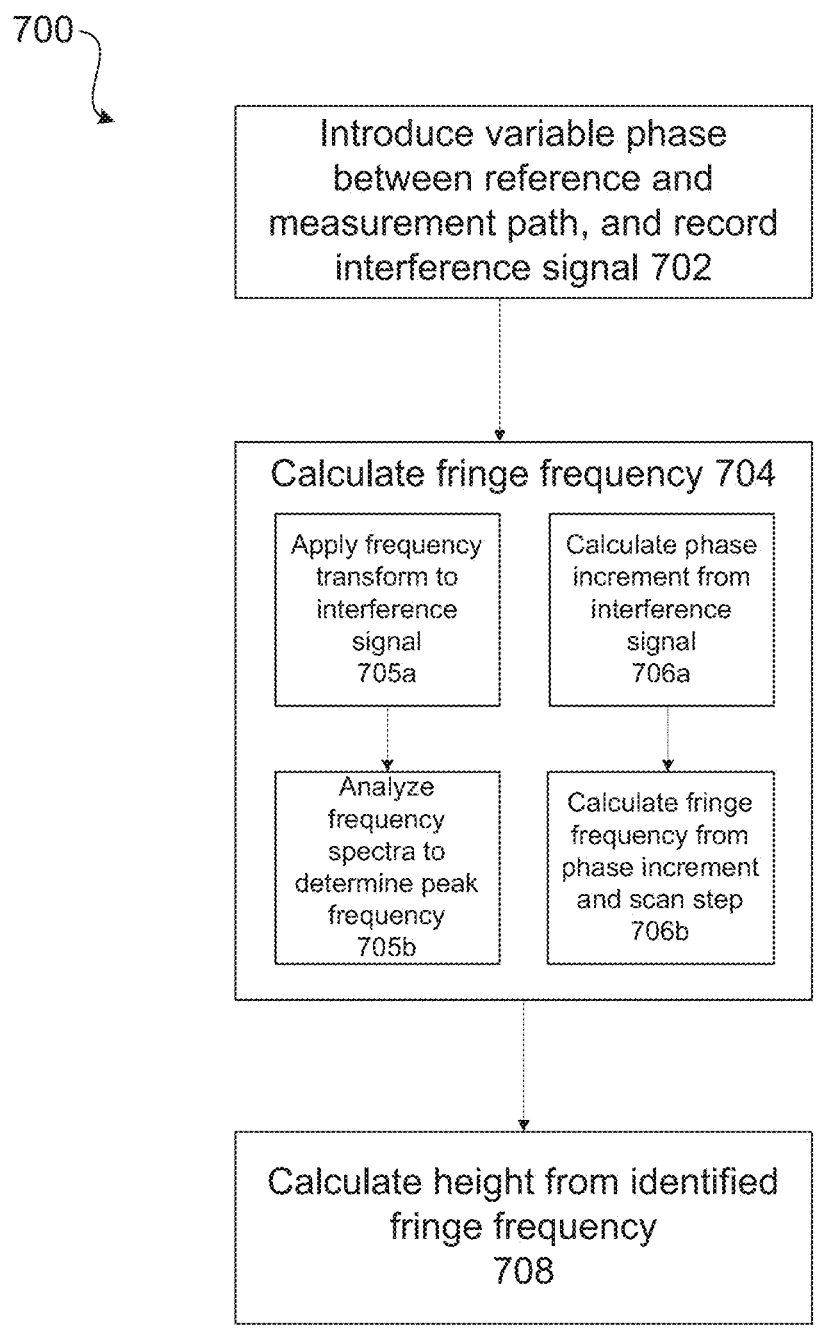
FIG. 7 is a flow chart depicting a process for measuring surface height using a dispersion-imbalanced interferometer.

An example data processing method 700 for determining the height of a measurement object using the apparatus of FIG. 1 is shown in FIG. 7 and involves the following actions. First, a variable phase is introduced (702) between the measurement beam and reference beam. Introduction of the variable phase may be accomplished, for example, by scanning the reference object or the measurement object over a distance that generates at least one full interference cycle. Scanning the reference object or the measurement object causes a modulation in the OPD between light traveling along the reference path and light traveling along the measurement path. During scanning, intensity values resulting from the interference of the measurement beam and reference beam at the detector 59 are recorded for a single pixel or for multiple pixels, the value(s) recorded at each pixel corresponding to a different point on the measurement object. As noted above, a key characteristic of the dispersion-imbalanced interferometry method compared to conventional CSI is that it is unnecessary to capture the entire interference pattern to determine the height position with respect to the zero position. Rather, only a localized portion of the interference signal needs to be recorded. Such a localized portion may include a minimum of one fringe of the interference signal.

Following measurement of the interference signal, the fringe frequency as a function of scan position is calculated (704) for each recorded interference signal, i.e., for each pixel. Various methods may be used to determine the interference signal fringe frequency as a function of scan position. For example, a frequency transform, such as a digital Fourier transform, may be applied (705*a*) to the interference signal for each position to create spectra of signal strength as a function of fringe frequency. Once the frequency spectra are obtained, the magnitude of each spectrum may be analyzed (705*b*) to determine the peak frequency for each position.

Alternatively, a phase-shift interferometry analysis of each interference signal may be performed to determine the fringe frequency. For example, the interference signal may be analyzed using an algorithm that calculates the phase step between detector frames. An example of a well-known algorithm for calculating the phase step is the Cane algorithm. In the Cane algorithm, the fringe frequency for one complete interference cycle may be calculated using a minimum of four separate intensity values from four corresponding detector frames. The phase increment in the Carré algorithm can be calculated (706*a*) as $$\alpha = \tan^{-1}\left[\frac{3(I_2 - I_3) - (I_1 - I_4)}{(I_1 - I_4) - (I_2 - I_3)}\right] \quad (33)$$

where $I_n$ is the intensity value for different detector frames $n=1 \ldots 4$. Assuming that the scan step between acquisitions of the intensities I is known to be $\zeta_\Delta$, the corresponding fringe frequency then may be calculated (706*b*) as $$K = \alpha/\zeta_\Delta \quad (34)$$

Other techniques known in the art also may be used to determine the fringe frequency from the interference signal.

Once the fringe frequency is known from (705*b*) or (706*b*), the height is calculated (708) as a function of field of view position using the measured interference fringe frequency. For example, the height may be calculated using Eq.(29).

As explained above, a more precise height measurement may be obtained using the phase information at the peak height. Once the peak height is measured using Eq.(29), the phase at the peak height for each pixel, i.e., the phase of the interference signal corresponding to the peak fringe frequency, then is determined (e.g., using the Fourier component of K or a PSI algorithm). The final surface height then is calculated using equation (31).

Figure 8:
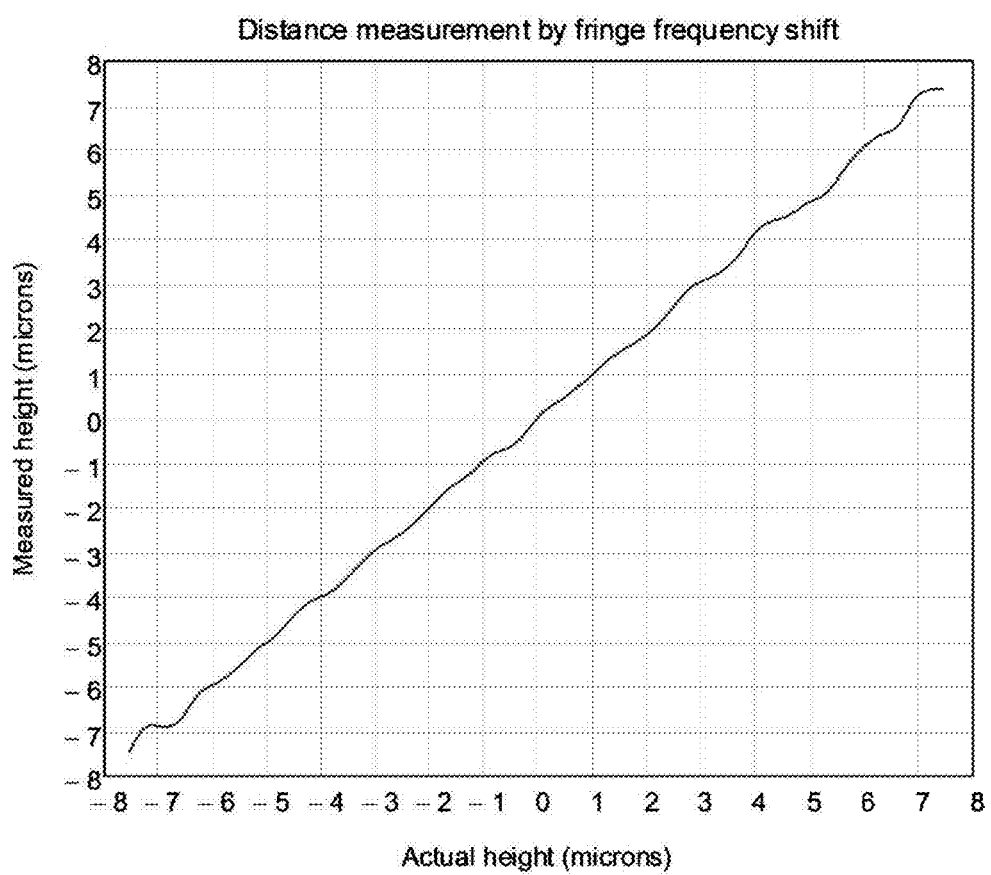
FIG. 8 is a plot of relative height measurement obtained from a simulated interference signal for an index dispersion imbalanced interferometer.

FIG. 8 is a plot of relative height measurement obtained from a simulated interference signal for an index dispersion imbalanced interferometer and a measurement object having a uniform surface, in which the measurement object surface is tilted toward the interferometer. The sampling increment $\zeta$ for the simulated interference signal was set equal to 75 nm and the noise level was set equal to 0.01 rms. The dispersion coefficient for introducing the index dispersion imbalance was set at Γ=2. Using only 24 detector frames, the useable range of measurement data (defined here as the FWHM of the coherence envelope) from the broadened interference signal was about 10 microns. Alternative definitions for the useable range of measurement data may also be used. The mean wavelength and FWHM of the optical spectrum used to obtain the data in FIG. 8 are 520 nm and 200 nm, respectively. The height values were calculated by applying a frequency transform, such as a 24-frame sliding window Fourier transform, to the interference signal and then performing a frequency peak search of the interference data to identify the peak frequency as a function of scan position. Eq.(29) then was applied to the peak frequency data to provide a straightforward calculation for converting the identified peak frequencies to measured surface heights as a function of the programmed scan step. Since the plot shown in FIG. 8 is obtained by simulation, the "actual" height is perfectly known.

Interferometer Design Having Refractive Index Dispersion Imbalance

Assuming a desired quadratic phase contribution is known, it is possible to calculate the required material imbalance (e.g., through the incorporation of a dispersive optical element) for the interferometer system. Using a linear approximation for refractive index (see Eq.(18)), the dispersion can be expressed as $$\frac{dn}{dk} \approx \frac{n_2 - n_1}{k_2 - k_1} \quad (35)$$

where the wavenumbers $k_2$, $k_1$ straddle the mean value $\bar{k}$ and preferably, are equidistant from this mean value, and the wavenumbers relate to the wavelengths $\lambda_2$, $\lambda_1$ according to Eq.(8). Refractive index values for Eq.(30) are given in TABLE 1 for example materials.

TABLE 1

| Material | $\lambda_1$ (nm) | $n_1$ | $\lambda_2$ (nm) | $n_2$ | dn/dk (nm) |
|---|---|---|---|---|---|
| SiO$_2$ | 576.959 | 1.45885 | 467.816 | 1.46429 | 2.141 |
| K5 glass | 546.1 | 1.52458 | 435.8 | 1.53338 | 3.022 |

The K5 glass is K5-522595 from Schott®, whereas the refractive index values for SiO$_2$ are obtained from *Handbook of Optical Constants of Solids*, Edward D. Palik, Academic Press, p. 759 (1991). Using the dispersion as calculated above, a thickness of the uncompensated material (e.g., the dispersive optical element 66 in FIG. 1) according to the FWHM spectral bandwidth in wavenumbers and the desired nonlinearity coefficient may be calculated from $$\Gamma = \frac{k_\Delta^2}{2} \frac{dn}{dk} T. \quad (24)$$

As explained above, $\Gamma$ is the value of the quadratic nonlinear phase contribution when the fringe frequency corresponds to the FWHM points in the spectrum. The thickness of the uncompensated material incorporated into either the reference or measurement path may then be expressed as $$T = \frac{2\Gamma}{k_\Delta^2} \frac{1}{dn/dk}. \quad (36)$$

As a reminder, the corresponding shift in the G-OPD is $$\bar{\zeta} = \bar{n}T - \frac{1}{2}\bar{K}\frac{dn}{dk}T \quad (22)$$

where $\bar{K}=2\bar{k}$. TABLE 2 lists the required thickness for the two different material types in TABLE 1 for the example quadratic phase nonlinearity ($\Gamma=2$) and optical spectrum illustrated in FIG. 5. Note that the required glass thickness for a given value of $\Gamma$ increases rapidly with decreasing bandwidth $k_\Delta$. For example, a superluminescent diode having a 10 nm bandwidth would require 400 times the glass thickness listed in TABLE 2 for the same $\Gamma=2$ coefficient.

TABLE 2

| Material | dn/dk (nm) | $\bar{n}$ | T (µm) | $\bar{\zeta}$ (µm) |
|---|---|---|---|---|
| SiO$_2$ | 2.141 | 1.461 | 504 | 724 |
| K5 glass | 3.022 | 1.526 | 357 | 532 |

Additional Interferometer Configurations

Figure 9:
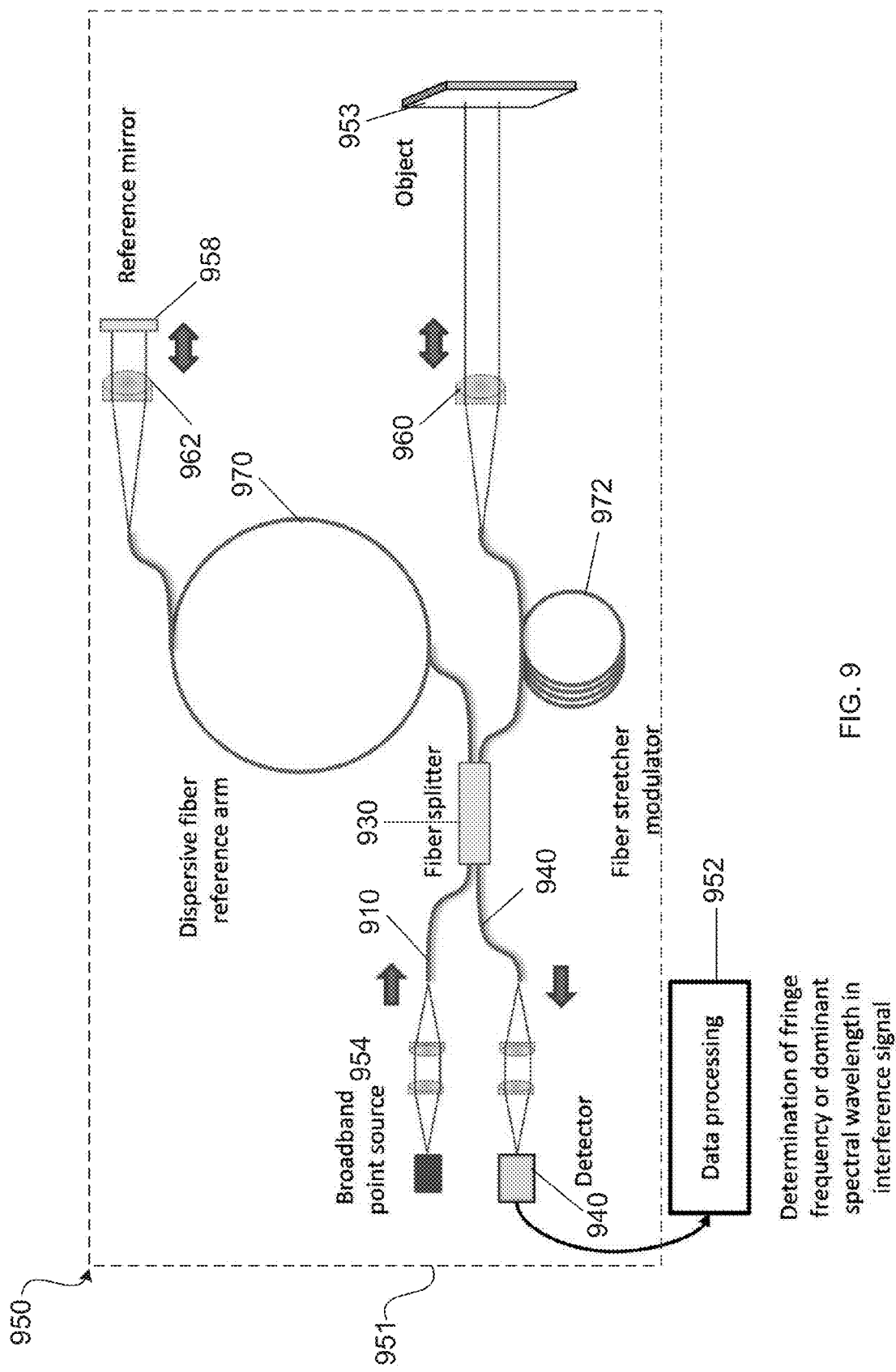
FIG. 9 is a schematic illustrating an example of a coherence scanning interferometer system.

Dispersion imbalanced interferometer configurations are not limited to the arrangements disclosed with respect to FIG. 1. For example, in some embodiments, the measurement and/or reference paths may include fiber optic components. FIG. 9 is a schematic illustrating an example of a coherence scanning interferometer system 950 in which each of the reference path and the measurement path includes an optical fiber. The system 950 includes an interferometer portion 951 and a control system portion 952. The interferometer portion 951 has a light source 954, such as a broadband point source, that provides light to an input fiber 910. The light travels through the input fiber 910 to a fiber splitter 930, which splits the input light so that a first portion travels along a fiber 970 corresponding to the reference path and a second portion travels along a fiber 972 corresponding to the measurement path. The fiber 970 emits the first portion toward a collimating lens 962 and the reference object 958, such as a mirror. The reference mirror 958 may be coupled to a translation stage that allows a distance of the mirror 958 from the fiber 970 to be varied over a desired scan range. Light reflected from object 958 is transmitted back through lens 962 and into fiber 970. In some implementations, the fiber 970 corresponds to the dispersive element which introduces the refractive index dispersion imbalance with respect to the measurement path of the interferometer. For example, the optical fiber 970 may be formed of glass or plastic configured to transmit light having wavelengths of the source light, in which the fiber also induces dispersion of the broadband light traveling through the fiber.

The second portion of light is emitted by the fiber 972 towards an imaging objective 960 and the measurement object 953. The measurement object 953 may be coupled to a translation stage that allows the distance between the measurement object 953 and fiber 972 to be varied over the scan range. In some implementations, the fiber 972 also includes a stretchable optical fiber, such that a length of the fiber 972 can be varied. For example, the fiber 972 may be wound around a piezoelectric fiber stretcher modulator. Through application of a voltage to the fiber stretcher modulator, the modulator expands or contracts the fiber 972 leading to a change in fiber length, and thus the distance traveled by light along the fiber 972. The variation in fiber length can be used to analyze a local fringe frequency over a small range relative to the scan range enabled by translating the measurement object or reference object. With the peak local fringe frequency known, the nominal position of the scan may be determined, as previously set forth.

Both the reflected first portion and second portion of light are combined in the fiber splitter 930 and are transmitted to an output fiber 940. The output fiber 940 emits the combined light toward a detector 959, which produces the interference signal, that is then acquired by the computer control system 952.

Figure 10:
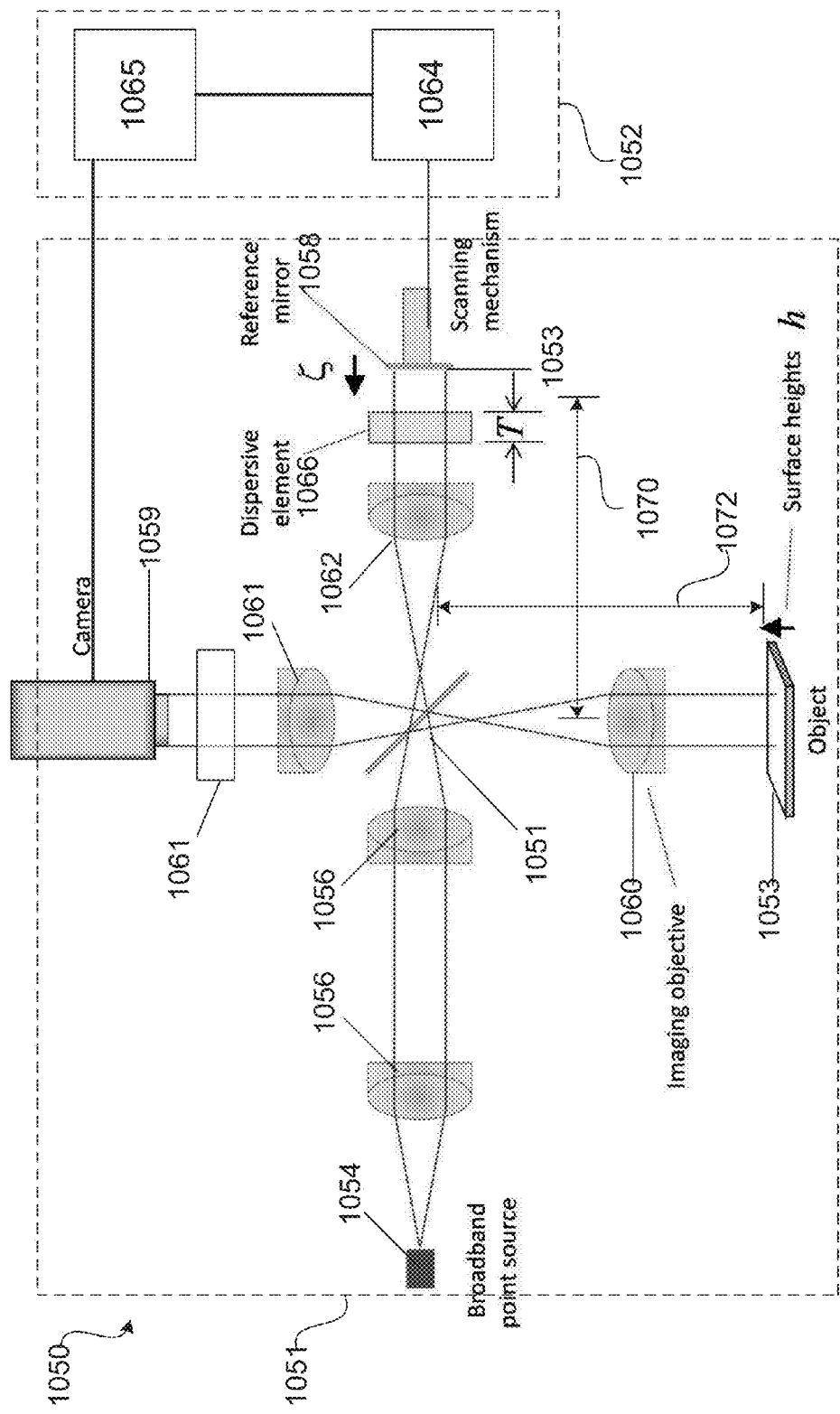
FIG. 10 is a schematic illustrating an example of a coherence scanning interferometer system.

In some embodiments, the identification of the scan position can be enhanced through the incorporation of color filters in the interferometer system. For example, by placing a color filter in the path of the combined measurement and reference beam before the beam reaches the detector, the strength of the interference signal measured at the detector will depend on the color of the filter. FIG. 10 is a schematic of a dispersion imbalanced interferometry system 1050 similar to system 50, except that system 1050 includes a color filter 1010 positioned in front of detector 1059. The filter 1010 may be manually changed to transmit different wavelengths. In some implementations, the detector 1059, itself, is configured to include color filters. For example, the detector 1059 may be a color camera or color CCD, in which each pixel is situated beneath a corresponding color filter (e.g., a red, green, or blue filter). Because the dominant spectral wavelength changes with scan position in a dispersion imbalanced interferometer, the interference signal appears strongest when scanned over a position corresponding to the wavelength of the filter. From this information, one may infer the scan position of the measurement object or reference object relative to the zero OPD position. For example, if the detector in a dispersion-imbalanced interferometer using a white light source records an interference signal for a pixel employing a filter corresponding to the red portion of the visible spectrum, a user may infer that the scan position is beneath the position corresponding to the zero OPD position. Alternatively, if the detector records an interference signal for a pixel employing a filter corresponding to the blue portion of the visible spectrum, the user may infer that the scan position is above the zero OPD position. If the wavelength of the filters is known, a user may be able to identify the peak frequency for an interference signal recorded by each filtered pixel using Eqs.(7) and (8). Once the peak frequency for each recorded interference signal is obtained, the corresponding scan position may be calculated using Eq.(29).

Scanning the reference and/or measurement objects is an example of introducing a variable phase between the measurement and reference beams. Other techniques may also be used to introduce a variable phase in the interference signal, from which relative height measurements may be obtained in a dispersion-imbalanced interferometer. For example, in some embodiments, the interferometer may be configured as a polarization interferometer having a pixelated phase-mask, such as described in Millerd, et al., "Pixelated phase-mask dynamic interferometer," Proc. SPIE 5531, 304-314, 2004, which is incorporated herein by reference in its entirety. In a pixelated phase-mask dynamic interferometer, the reference and measurement beams are configured to have orthogonal polarizations. Furthermore, the system includes a pixelated phase-mask in front of the detector, where the phase-mask introduces an effective phase-delay between the reference and measurement wavefronts. In particular, each pixel of the phase-mask has a unique phase-shift corresponding to phase-steps arranged in a pattern, such as a "unit cell" of four different phase-steps. For example, a unit cell may be composed of a polarizer oriented at zero degrees in the (0,0) position of the unit cell, a polarizer oriented at 45 degrees in the (0,1) position of the unit cell, a polarizer oriented at 90 degrees in the (1,0) position of the unit cell, and a polarizer oriented at 135 degrees in the (1,1) position of the unit cell. The unit cell then is repeated contiguously over the entire mask. By providing at least three discrete phase-shifts in a unit cell, interferograms corresponding to each of the discrete phase-shifts may be produced with a single detector frame. Phase information for each pixel then may be extracted using the multiple interferograms, and subsequently fringe frequency and height values can be extracted as explained above.

Exemplary Applications

Coherence scanning interferometry employing an intentional refractive index dispersion imbalance may be used in various different metrology applications including, for example, measurements of surface topography and/or other characteristics of objects having complex surface structures, such as discrete structures of dissimilar materials, or discrete structures that are underresolved by the optical resolution of an interference microscope, such as, for example, unresolved surface roughness or sub-wavelength width grooves on an otherwise smooth surface. By "underresolved" it is meant that the individual features of the object are not fully separated in an optical surface profile image taken using the interference microscope as a consequence of the limited lateral resolution of the instrument. Surface topography measurements are relevant to the characterization of semiconductor wafer metrology and solder-bump metrology. See, e.g., U.S. Patent Publication No. US-2004-0189999-A1 by Peter de Groot et al. entitled "Profiling Complex Surface Structures Using Scanning Interferometry" and published on Sep. 30, 2004, the contents of which are incorporated herein by reference, and U.S. Patent Publication No. US-2004-0085544-A1 by Peter de Groot entitled "Interferometry Method for Ellipsometry, Reflectometry, and Scatterometry Measurements, Including Characterization of Thin Film Structures," the contents of which are incorporated herein by reference.

Exemplary applications in which dispersion imbalanced interferometry may be used are discussed next.

IC Packaging and Interconnect Metrology

Among other things, advances in chip scale packaging, wafer-level packaging, and 3D packaging for integrated circuits have led to shrinking feature sizes and large aspect ratios that create challenges for surface metrology applications, such as solder-bump metrology, through-silicon via (TSV) metrology, and re-distribution layer (RDL) metrology in terms of lateral feature resolution and efficiency. For example, although general coherence scanning interferometry (CSI) enables the measurement of surface structures having surface height differences between neighboring imaging pixels that are more than one-half wavelength without the fringe ambiguity of phase-shifting interferometry, conventional CSI may be limited due to its speed and scanning range. Use of the systems and methods discussed herein in solder-bump, TSV, and RDL metrology offers the benefits of coherence scanning interferometry while improving acquisition speed and enlarging the range over which structures may be scanned.

Figure 11A:
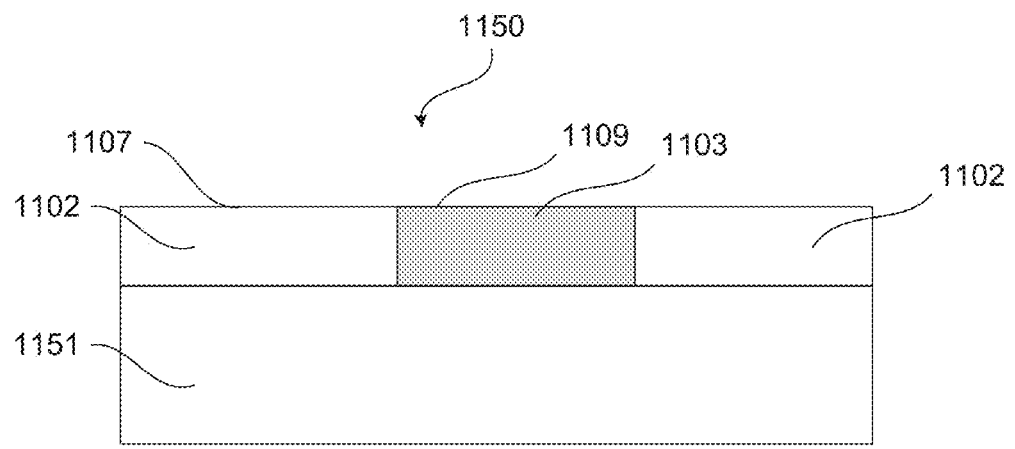
FIG. 11A is a schematic diagram of a structure suitable for use in solder-bump processing.
Figure 11B:
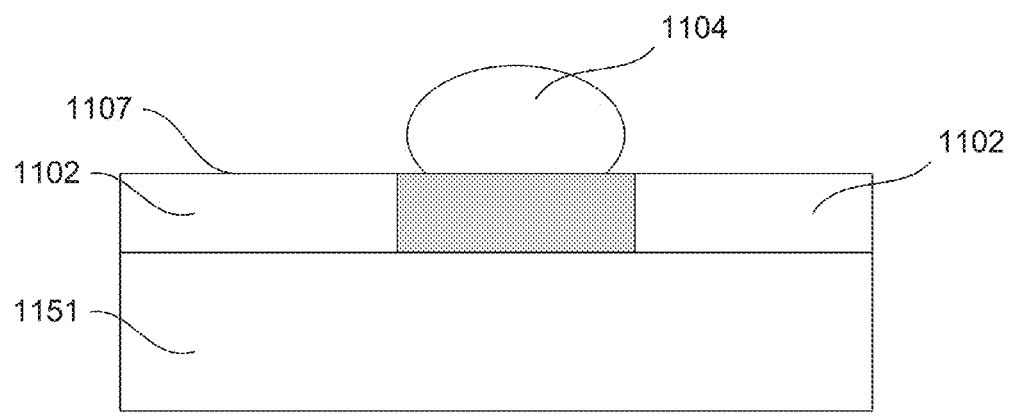
FIG. 11B is a schematic diagram of the structure in FIG. 11A after solder bump processing has occurred.

Referring to FIGS. 11A and 11B, a structure 1150 is exemplary of a structure produced during solder bump processing. Structure 1150 includes a substrate 1151, regions 1102 non-wettable by solder, and a region 1103 wettable by solder. Regions 1102 have an outer surface 1107. Region 1103 has an outer surface 1109.

During processing a mass of solder 1104 is positioned in contact with wettable region 1103. Upon flowing the solder, the solder forms a secure contact with the wettable region 1103. Adjacent non-wettable regions 1102 act like a dam preventing the flowed solder from undesirable migration about the structure. It is desirable to know spatial properties of the structure including the relative heights of surfaces 1107, 1109 and the dimensions of solder 1104 relative to surface 1102. Structure 1150 includes a plurality of interfaces between regions that may each result in an interference pattern. As shown in FIG. 11A, the solder 1104 may have a spherical, quasi-spherical shape, or relatively flat. In some implementations, the solder may have a top-hat shape in which the base of the solder near the substrate is laterally broader than a top portion of the solder. The height of the solder features that can be scanned using the systems and methods described herein may range from about 5 microns to over 60 microns (e.g., about 10 microns, about 20 microns, about 30 microns, about 40 microns, or about 50 microns). The solder features may be separated from one another by distances from about 5 microns to 100 microns.

The interferometry systems and methods disclosed herein can be used to evaluate the surface topology of the solder bumps in a reproducible and relatively fast manner that, offering increased sample evaluation throughput.

Semiconductor Processing

The systems and methods described above can be used in a semiconductor process for tool specific monitoring or for controlling the process flow itself. In the process monitoring application, single/multi-layer films are grown, deposited, polished, or etched away on unpatterned Si wafers (monitor wafers) by the corresponding process tool and subsequently the thickness and/or optical properties are measured using the dual-detector interferometry system disclosed herein. The surface topology and/or wafer uniformity of these monitor wafers are used to determine whether the associated process tool is operating with targeted specification or should be retargeted, adjusted, or taken out of production use.

In the process control application, single/multi-layer films are grown, deposited, polished, or etched away on patterned Si, production wafers by the corresponding process tool and subsequently the thickness and/or optical properties are measured with the interferometry system employing the sliding window LSQ technique disclosed herein. Production measurements used for process control typically include a small measurement site and the ability to align the measurement tool to the sample region of interest. This site may consists of multi-layer film stack (that may itself be patterned) and thus requires complex mathematical modeling in order to extract the relevant physical parameters. Process control measurements determine the stability of the integrated process flow and determine whether the integrated processing should continue, be retargeted, redirected to other equipment, or shut down entirely.

Specifically, for example, the interferometry systems and methods disclosed herein can be used to monitor devices and materials fabricated using the following equipment: diffusion, rapid thermal anneal, chemical vapor deposition tools (both low pressure and high pressure), dielectric etch, chemical mechanical polishers, plasma deposition, plasma etch, lithography track, and lithography exposure tools. Additionally, the interferometry system disclosed herein can be used to monitor and control the following processes: trench and isolation, transistor formation, as well as interlayer dielectric formation (such as dual damascene).

Figure 12:
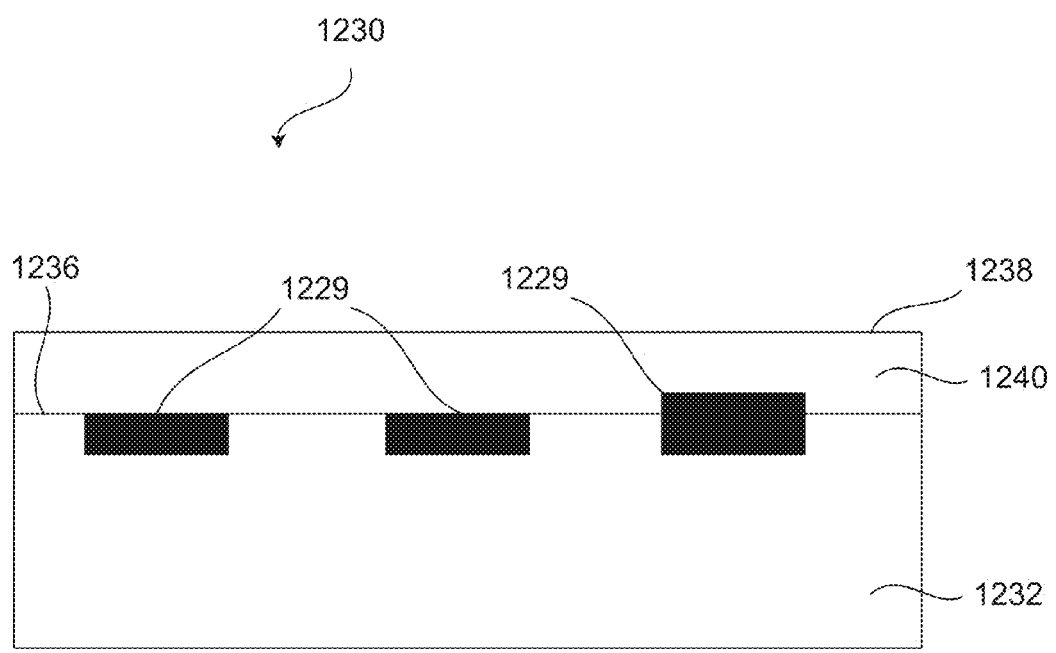
FIG. 12 is a schematic diagram showing a side view of an object which includes a substrate and an overlying layer.

FIG. 12 is an example of an object 1230 that may be monitored during fabrication of a microelectronic device. Object 1230 includes a substrate, e.g., a wafer, 1232 and an overlying layer, e.g., photoresist layer 1234. Object 1230 includes a plurality of interfaces as occur between materials of different refractive index. For example, an object-surroundings interface 1238 is defined where an outer surface of photoresist layer 1234 contacts the environment surrounding object 1230, e.g., liquid, air, other gas, or vacuum. A substrate-layer interface 1236 is defined between a top surface of wafer 1232 and a bottom surface of photoresist layer 1234. A surface of the wafer may include a plurality of patterned features 1229. Some of these features have the same height as adjacent portions of the substrate but a different refractive index. Other features may extend upward or downward relative to adjacent portions of the substrate. Accordingly, interface 1236 may exhibit a complex, varying topography underlying the outer surface of the photoresist. During the photolithography process, the low coherence scanning interferometers disclosed herein may be used to analyze the surface properties of object 1230, such as the surface topology or the relative height of additional layers formed within object 1230.

Computer Implementation

Depending on the embodiment, the techniques and analyses described herein for processing interference signals can be implemented using control electronics in an interferometer system, in which the control electronics are implemented through hardware or software, or a combination of both. The techniques can be implemented in computer programs using standard programming techniques following the methods and figures described herein. Program code is applied to input data to perform the functions described herein and generate output information. The output information (e.g., position information related to a relative position of a target object to the optical assembly) is applied to one or more output devices such as a display device. Each program may be implemented in a high level procedural or object oriented programming language to communicate with a computer system, or the programs can be implemented in assembly or machine language, if desired. In any case, the language can be a compiled or interpreted language. Moreover, the program can run on dedicated integrated circuits preprogrammed for that purpose.

Each such computer program may be stored on a storage medium or device (e.g., ROM, magnetic diskette, FLASH drive, among others) readable by a general or special purpose programmable computer, for configuring and operating the computer when the storage media or device is read by the computer to perform the procedures described herein. The computer program can also reside in cache or main memory during program execution. The analyses described herein can also be implemented as a computer-readable storage medium, configured with a computer program, where the storage medium so configured causes a computer to operate in a specific and predefined manner to perform the functions described herein.

Embodiments relate to interferometry systems and methods for determining information about a measurement object. Additional information about suitable low-coherence interferometry systems, electronic processing systems, software, and related processing algorithms is disclosed in commonly owned U.S. Pat. Nos. 5,600,441, 6,195,168, 7,321,431, 7,796,273, and U.S. Patent Applications published as US-2005-0078318-A1, US-2004-0189999-A1, and US-2004-0085544-A1, the contents of each of which are incorporated herein by reference in their entirety.

A number of embodiments have been described. Nevertheless, it will be understood that various modifications may be made without departing from the spirit and scope of the invention. Other embodiments are within the scope of the following claims.

What is claimed is:

1. An interferometry system comprising:
  a light source configured to emit light over a range of wavelengths to define a coherence length;
  an interferometer configured to direct a measurement beam along a measurement path contacting a measurement surface of a measurement object, direct a reference beam along a reference path contacting a reference surface, and combine the measurement and reference beams to form an output beam after the measurement and reference beams contact the measurement and reference surfaces, respectively, wherein the measurement and reference beams are derived from the light source, and wherein the interferometer comprises a dispersive element to provide a dispersion imbalance between the measurement and reference paths large enough to produce a coherence envelope for the interferometry system having a width more than twice the coherence length;
a phase modulation device configured to introduce a variable phase between the measurement and reference beams;
a detector;
imaging optics to direct the output beam to the detector and produce an image of the measurement surface; and
an electronic processor electronically coupled to the phase modulation device and the detector and configured to
record multiple interference signals corresponding to different locations on the measurement surface, wherein the interference signals are based on the intensity of the output beam as a function of the variable phase for the different locations of the measurement surface,
process the multiple interference signals to determine information about the measurement surface based on interference signals, from the multiple interference signals, corresponding to a range of optical path differences (OPDs) between the measurement and reference paths, wherein the absolute values of the OPDs in the range are greater than half the coherence length and smaller than twice the width of the coherence envelope.

2. The system of claim 1, wherein the dispersive element comprises additional material of an optical component in an optical path of one of the measurement and reference paths relative to the other one of the measurement and reference paths.

3. The system of claim 2, wherein the additional material of the optical component comprises glass.

4. The system of claim 2, wherein the additional material has a thickness along the optical path greater than about 10 μm.

5. The system of claim 1, wherein the dispersion imbalance introduces a nonlinear phase deviation to the multiple interference signals that is greater than one radian over the full-width half-maximum (FWHM) of the coherence envelope.

6. The system of claim 1, wherein the phase modulation device comprises a mechanical stage configured to move one of the measurement surface or the reference surface relative to the other one of the measurement surface or the reference surface to introduce a difference in optical path length between the measurement path and the reference path.

7. The system of claim 6, wherein the mechanical stage is configured to scan the difference in optical path length over a range larger than the coherence length of the light source.

8. The system of claim 1, wherein the reference and measurement beams have orthogonal polarizations, and the phase modulation device comprises a pixelated phase mask, the phase mask comprising an array of unit cells, each unit cell comprising at least three polarizers, and each polarizer being configured to introduce a different discrete phase-shift to the output beam.

9. The system of claim 1, wherein the range of OPDs between the measurement and reference paths excludes a zero OPD.

10. The system of claim 1, wherein the absolute values of the OPDs in the range are greater than the coherence length and smaller than the width of the coherence envelope.

11. The interferometry system of claim 1 comprising a plurality of dispersive elements to provide the dispersion imbalance between the measurement and reference paths.

12. A method comprising:
directing a measurement beam along a measurement path so as to contact a measurement surface of a measurement object;
directing a reference beam along a reference path so as to contact a reference surface, wherein the measurement beam and the reference beam are derived from light emitted by a common source, the light comprising a plurality of wavelengths and having a coherence length;
providing a dispersion-imbalance between the measurement path and the reference path large enough to produce a coherence envelope having a width more than twice the coherence length;
combining the measurement and reference beams to form an output beam after the measurement and reference beams contact the measurement and reference surfaces, respectively;
directing the output beam to a detector;
introducing a variable phase between the measurement and reference beams while directing the output beam to the detector;
recording, from the detector, multiple interference signals corresponding to different locations on the measurement surface, wherein the multiple interference signals are based on the intensity of the output beam as a function of the variable phase for the different locations of the measurement surface; and
processing the multiple interference signals to determine information about the measurement surface based on interference signals, from the multiple interference signals, corresponding to a range of optical path differences (OPDs) between the measurement and reference paths, wherein the absolute values of the OPDs in the range are greater than half the coherence length and smaller than twice the width of the coherence envelope.

13. The method of claim 12, wherein providing the dispersion-imbalance comprises introducing additional material of an optical component in an optical path of one of the measurement and reference paths relative to the other one of the measurement and reference paths.

14. An interferometry system comprising:
a light source configured to emit light over a range of wavelengths to define a coherence length;
an interferometer configured to direct a measurement beam along a measurement path contacting a measurement surface of a measurement object, direct a reference beam along a reference path contacting a reference surface, and combine the measurement and reference beams to form an output beam after the measurement and reference beams contact the measurement and reference surfaces, respectively, wherein the measurement and reference beams are derived from the light source, and wherein the interferometer comprises a dispersive element to provide a dispersion imbalance between the measurement and reference paths large enough to produce a coherence envelope for the interferometry system having a width more than twice the coherence length;
a phase modulation device configured to introduce a variable phase between the measurement and reference beams;
a detector;
imaging optics to direct the output beam to the detector and produce an image of the measurement surface; and
an electronic processor electronically coupled to the phase modulation device and the detector and configured to
record multiple interference signals corresponding to different locations on the measurement surface, wherein the multiple interference signals are based on the intensity of the output beam as a function of the variable phase for the different locations of the measurement surface, process the multiple interference signals to determine information about the measurement surface, and calculate a localized fringe frequency for each of the multiple interference signals and use the calculated localized fringe frequencies to determine the information about the measurement surface.

15. The system of claim 14, wherein the electronic processor is configured to cause the detector to measure the multiple interference signals over a range of optical path differences (OPDs) between the measurement and reference paths sufficient to determine the localized fringe frequencies for each of the multiple interference signals.

16. The system of claim 15, wherein the electronic processor is configured to calculate each localized fringe frequency based on a location of an intensity peak in a frequency transform of each interference signal of the multiple interference signals.

17. The system of claim 15, wherein the electronic processor is configured to calculate a phase step between successive frames recorded by the detector.

18. The system of claim 17, wherein the electronic processor is configured to calculate the phase step based on at least four separate intensity values from four corresponding detector frames.

19. The system of claim 17, wherein the mechanical stage is configured to scan the difference in optical path length over a range larger than the coherence length of the light source at predetermined scan increments, and wherein the electronic processor is configured to calculate the localized fringe frequency based on the phase step and the predetermined scan increment.

20. The interferometry system of claim 14 comprising a plurality of dispersive elements to provide the dispersion imbalance between the measurement and reference paths.

21. An interferometry system comprising:
a light source configured to emit light over a range of wavelengths to define a coherence length;
an interferometer configured to direct a measurement beam along a measurement path contacting a measurement surface of a measurement object, direct a reference beam along a reference path contacting a reference surface, and combine the measurement and reference beams to form an output beam after the measurement and reference beams contact the measurement and reference surfaces, respectively, wherein the measurement and reference beams are derived from the light source, and wherein the interferometer comprises a dispersive element to provide a dispersion imbalance between the measurement and reference paths large enough to produce a coherence envelope for the interferometry system having a width more than twice the coherence length;
a phase modulation device configured to introduce a variable phase between the measurement and reference beams;
a detector;
imaging optics to direct the output beam to the detector and produce an image of the measurement surface; and
an electronic processor electronically coupled to the phase modulation device and the detector and configured to record multiple interference signals corresponding to different locations on the measurement surface, wherein the multiple interference signals are based on the intensity of the output beam as a function of the variable phase for the different locations of the measurement surface,
process the multiple interference signals to determine information about the measurement surface based on interference signals, from the multiple interference signals, corresponding to a range of optical path differences (OPDs) between the measurement and reference paths that exclude a zero OPD, wherein the range of OPDs is smaller than half the coherence length.

22. The interferometry system of claim 21 comprising a plurality of dispersive elements to provide the dispersion imbalance between the measurement and reference paths.

23. A method comprising:
directing a measurement beam along a measurement path so as to contact a measurement surface of a measurement object;
directing a reference beam along a reference path so as to contact a reference surface, wherein the measurement beam and the reference beam are derived from light emitted by a common source, the light comprising a plurality of wavelengths and having a coherence length;
providing a dispersion-imbalance between the measurement path and the reference path large enough to produce a coherence envelope having a width more than twice the coherence length;
combining the measurement and reference beams to form an output beam after the measurement and reference beams contact the measurement and reference surfaces, respectively;
directing the output beam to a detector;
introducing a variable phase between the measurement and reference beams while directing the output beam to the detector; and
recording, from the detector, multiple interference signals corresponding to different locations on the measurement surface, wherein the multiple interference signals are based on the intensity of the output beam as a function of the variable phase for the different locations of the measurement surface; and
processing the multiple interference signals to determine information about the measurement surface, wherein processing the multiple interference signals comprises calculating a localized fringe frequency for each of the multiple interference signals and using the calculated localized fringe frequencies to determine the information about the measurement surface.

24. A method comprising:
directing a measurement beam along a measurement path so as to contact a measurement surface of a measurement object;
directing a reference beam along a reference path so as to contact a reference surface, wherein the measurement beam and the reference beam are derived from light emitted by a common source, the light comprising a plurality of wavelengths and having a coherence length;
providing a dispersion-imbalance between the measurement path and the reference path large enough to produce a coherence envelope having a width more than twice the coherence length;
combining the measurement and reference beams to form an output beam after the measurement and reference beams contact the measurement and reference surfaces, respectively;
directing the output beam to a detector;

introducing a variable phase between the measurement and reference beams while directing the output beam to the detector; and recording, from the detector, multiple interference signals corresponding to different locations on the measurement surface, wherein the multiple interference signals are based on the intensity of the output beam as a function of the variable phase for the different locations of the measurement surface; and processing the multiple interference signals to determine information about the measurement surface based on interference signals, from the multiple interference signals, corresponding to a range of optical path differences (OPDs) between the measurement and reference paths that exclude a zero OPD, wherein the range of OPDs is smaller than half the coherence length.

* * * * *